(12) United States Patent
Noh et al.

(10) Patent No.: US 11,283,509 B2
(45) Date of Patent: Mar. 22, 2022

(54) METHOD AND APPARATUS FOR TRANSMITTING AND RECEIVING SIGNAL IN WIRELESS COMMUNICATION SYSTEM

(71) Applicant: Samsung Electronics Co., Ltd., Suwon-si (KR)

(72) Inventors: Hoondong Noh, Suwon-si (KR); Youngwoo Kwak, Suwon-si (KR); Younsun Kim, Suwon-si (KR); Taehyoung Kim, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 16/383,943

(22) Filed: Apr. 15, 2019

(65) Prior Publication Data

US 2019/0319692 A1    Oct. 17, 2019

(30) Foreign Application Priority Data

Apr. 13, 2018 (KR) .................. 10-2018-0043461

(51) Int. Cl.
*H04B 7/06* (2006.01)
*H04B 7/0456* (2017.01)
*H04L 5/00* (2006.01)
*H04L 1/18* (2006.01)

(52) U.S. Cl.
CPC ......... *H04B 7/0697* (2013.01); *H04B 7/0456* (2013.01); *H04L 5/0048* (2013.01); *H04L 1/1812* (2013.01)

(58) Field of Classification Search
CPC ... H04B 7/0456; H04B 7/0697; H04L 1/1812; H04L 25/03891; H04L 5/0048; H04L 5/0053
USPC ....................................................... 370/328
See application file for complete search history.

(56) References Cited

U.S. PATENT DOCUMENTS

| 2014/0064354 A1* | 3/2014 | Nakano ............... H04J 11/00 375/233 |
| 2016/0049997 A1* | 2/2016 | Onodera ............. H04W 76/10 370/329 |
| 2018/0063828 A1* | 3/2018 | Wang ................. H04B 7/063 |

OTHER PUBLICATIONS

3GPP TSG RAN WG1 NR Ad-Hoc Meeting Spokane, USA, Jan. 16-20, 2017 (Year: 2017).*

(Continued)

*Primary Examiner* — Pankaj Kumar
*Assistant Examiner* — Kokou R Detse
(74) *Attorney, Agent, or Firm* — Jefferson IP Law, LLP

(57) ABSTRACT

A method of transmitting and receiving a signal, by a base station (BS), in a wireless communication system is provided. The method includes determining whether each of at least one terminal connected to the BS supports nonlinear precoding (NLP) or a modulo operation, determining a plurality of signals that are overlapping-transmitted in a time-frequency resource region from among a control signal, a reference signal (RS), and a data signal transmitted from the BS, based on whether the at least one terminal supports the NLP or the modulo operation, and transmitting, to each of the at least one terminal, information about whether the NLP or the modulo operation is performed in a resource where the plurality of signals are transmitted.

18 Claims, 25 Drawing Sheets

(56) References Cited

OTHER PUBLICATIONS

Nokia et al., On MU MIMO nonlinear precoding in NR, 3GPP TSG RAN WG1 NR Ad-Hoc Meeting, R1-1701087, Spokane, USA, Jan. 9, 2017, See section 2.

Huawei et al., Non-linear Precoding for Downlink Multiuser MIMO, 3GPP TSG RAN WG1 Ad-Hoc Meeting NR, R1-1700053, Spokane, USA, Jan. 9, 2017, See section 2.

Mitsubishi Electric, Summary of analysis of nonlinear precoding schemes for NR, 3GPP TSG RAN WG1 Meeting #88bis, R1-1705817, Spokane, USA, Mar. 25, 2017, See sections 2-4.

International Search Report dated Jul. 23, 2019, issued in the International Application No. PCTKR2019/004446.

* cited by examiner

FIG. 5

| 1T2R (5-00) | | | | 2T4R (5-05) | | | | 1T4R (5-10) | | | |
|---|---|---|---|---|---|---|---|---|---|---|---|
| SRS RESOURCE0 | SRS RESOURCE1 | SRS RESOURCE0 | SRS RESOURCE1 | SRS RESOURCE0 | SRS RESOURCE0 | SRS RESOURCE1 | SRS RESOURCE1 | SRS RESOURCE0 | SRS RESOURCE1 | SRS RESOURCE2 | SRS RESOURCE3 |
| P0 | P1 | P0 | P1 | P0,P2 | P0,P2 | P1,P3 | P1,P3 | P0 | P1 | P2 | P3 |
| P0 | P1 | P0 | P1 | P1,P3 | P0,P2 | P0,P2 | P1,P3 | | | | |

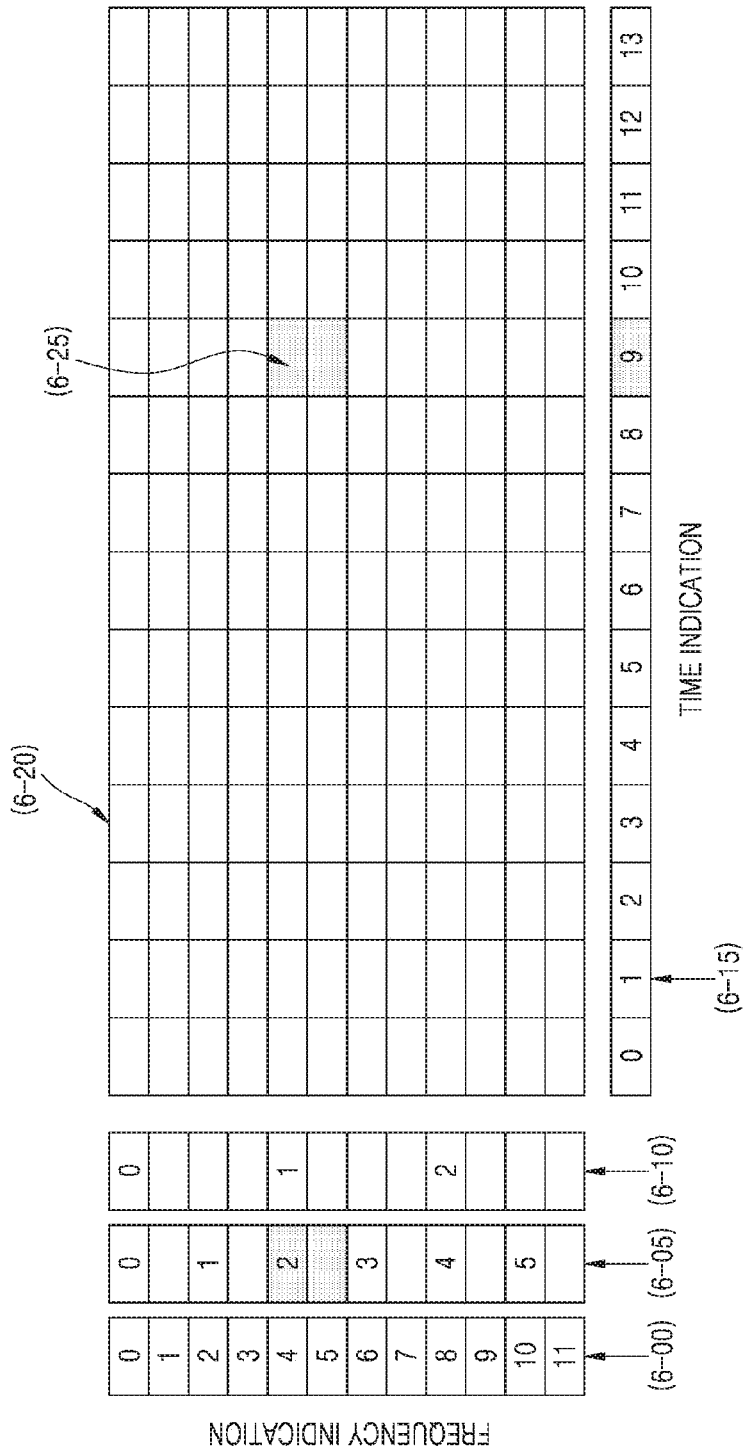

FIG. 19
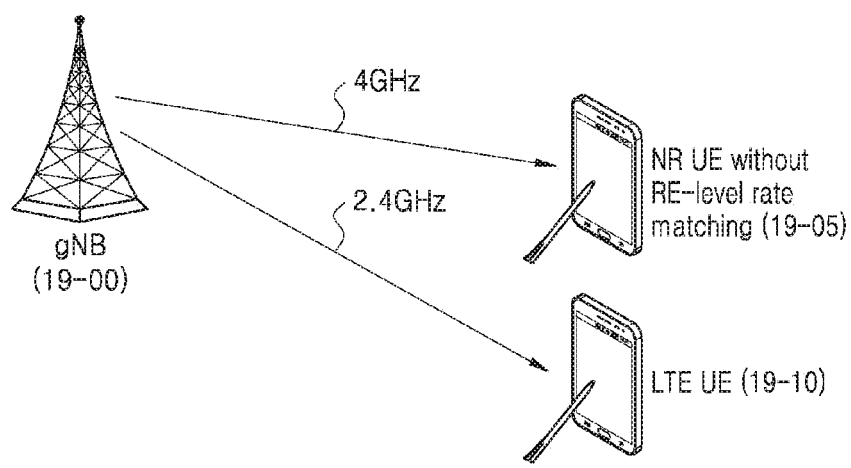
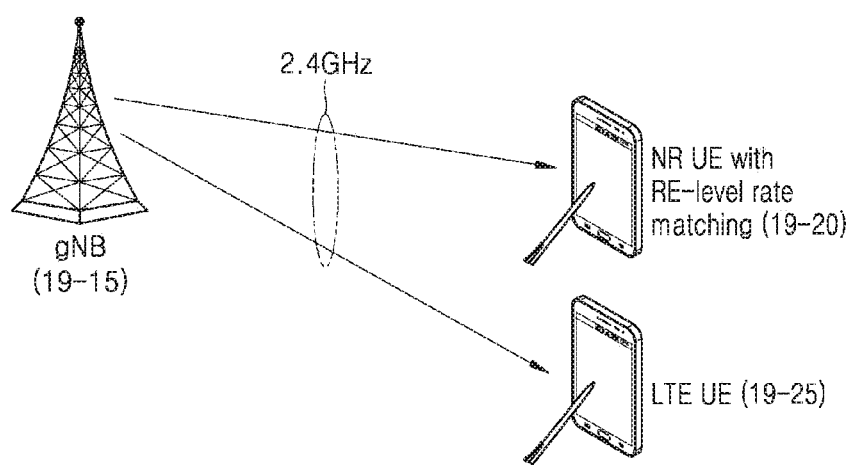

METHOD AND APPARATUS FOR TRANSMITTING AND RECEIVING SIGNAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0043461, filed on Apr. 13, 2018, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for transmitting and receiving a signal in a wireless communication system.

2. Description of Related Art

In order to meet the increasing demand with respect to wireless data traffic because of the commercialization of $4^{th}$ generation (4G) communication systems, efforts have been made to develop improved $5^{th}$ generation (5G) communication systems or pre-5G communication systems. For this reason, 5G communication systems or pre-5G communication systems are called beyond 4G network communication systems or post long term evolution (LTE) systems. In order to achieve a high data transfer rate, consideration is given to implementing 5G communication systems in millimeter wave (mmW) frequency bands (e.g., 60 GHz bands). In order to reduce propagation path loss and increase a propagation distance in the millimeter wave frequency bands, in 5G communication systems, discussions are underway about technologies, such as beam-forming, massive multiple input multiple output (MIMO), full dimensional MIMO (FD-MIMO), array antenna, analog beam-forming, and large scale antenna. In addition, in order to improve networks of systems, in 5G communication systems, developments of technologies, such as evolved small cell, advanced small cell, cloud radio access network (cloud RAN), ultra-dense network, device to device communication (D2D), wireless backhaul, moving network, cooperative communication, coordinated multi-points (CoMP), and interference cancellation are underway. Furthermore, in 5G communication systems, developments of an advanced coding modulation (ACM) scheme, such as hybrid frequency-shift keying (FSK) and quadrature amplitude modulation (QAM) (FQAM) and sliding window superposition coding (SWSC) and an enhanced network access scheme, such as filter bank multi carrier (FBMC), non-orthogonal multiple access (NOMA), or sparse code multiple access (SCMA) are underway.

The Internet is evolving from a human-centered connection network through which humans create and consume information to an Internet of things (IoT) network through which distributed elements, such as objects, exchange and process information. Internet of everything (IoE) technology, which is a combination of IoT technology and big data processing technology through connection with a cloud server, is also emerging. In order to implement the IoT, technology elements, such as detection technology, wired/wireless communication and network infrastructure, service interface technology, and security technology are required, and thus technology for inter-object connection, such as a sensor network, machine to machine (M2M) communication, or machine type communication (MTC), has recently been studied. In an IoT environment, intelligent Internet technology (IT) services that collect and analyze data generated by connected objects and create new value in human life may be provided. The IoT may be applied to fields, such as smart homes, smart buildings, smart cities, smart cars or connected cars, smart grids, health care, smart home appliances, and advanced medical services through convergence and integration of existing information technology (IT) and various industries.

Various attempts are made to apply 5G communication systems to IoT networks. For example, technology, such as a sensor network, M2M communication, or MTC is implemented by 5G communication technology, such as beam-forming, MIMO, or array antenna. The application of a cloud RAN as big data processing technology may also be considered as an example of convergence of 5G technology and IoT technology.

Because mobile communication systems may provide various services due to the development of the above mobile communication systems, methods of effectively providing the services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a signal transmission/reception method for supporting nonlinear precoding (NLP) in a wireless communication system.

Additional aspects will be set forth in part in the description which follows and, in part, will be apparent from the description, or may be learned by practice of the presented embodiments.

In accordance with an aspect of the disclosure, a method of transmitting and receiving a signal, by a base station (BS), in a wireless communication system is provided. The method includes determining whether each of at least one terminal connected to the BS supports NLP or a modulo operation, determining a plurality of signals that are overlapping-transmitted in a time-frequency resource region from among a control signal, a reference signal (RS), and a data signal transmitted from the BS, based on whether the at least one terminal supports the NLP or the modulo operation, and transmitting, to each of the at least one terminal, information about whether the NLP or the modulo operation is performed in a resource where the plurality of signals are transmitted.

The determining of the plurality of signals that are overlapping-transmitted may include determining the plurality of signals that are overlapping-transmitted from among the control signal, the RS, and the data signal, of a terminal supporting NLP from among the at least one terminal.

The determining of the plurality of signals that are overlapping-transmitted may include determining a rate matching type of a terminal supporting NLP among the at least one terminal, and determining signals that are overlapping-transmitted with the data signal among the control signal and the RS, in response to the rate matching type supporting NLP.

The determining of the plurality of signals that are overlapping-transmitted may include in response to a slot, in which a use of the rate matching type is indicated, being ahead of a slot, in which the RS and the data signal are overlapping-transmitted, determining the signal that are overlapping-transmitted with the data signal among the control signal and the RS.

The determining of the plurality of signals that are overlapping-transmitted may include determining a RS multiplexing type of a terminal supporting the NLP among the at least one terminal, and determining signals that are overlapping-transmitted with the data signal among the control signal and the RS, in response to the RS multiplexing type supporting NLP.

The determining of the plurality of signals that are overlapping-transmitted may include in response to a slot, in which a use of the RS multiplexing type is indicated, being ahead of a slot, in which the RS and the data signal are overlapping-transmitted, determining the signal that are overlapping-transmitted with the data signal among the control signal and the RS.

The transmitting of the information may include determining whether to perform the non-linear precoding through an upper layer signaling, and transmitting information of a resource, in which the NLP is performed, through a L1 signaling.

In accordance with another aspect of the disclosure, a method of transmitting and receiving a signal, by a terminal, in a wireless communication system is provided. The method includes transmitting, to a BS, performance information regarding whether NLP or a modulo operation is supported, receiving, from the BS, information regarding whether the NLP or the modulo operation is performed in a predetermined resource in a time-frequency resource region determined based on the performance information, and obtaining one of a control signal, a RS, or a data signal transmitted to the terminal by performing the modulo operation on a signal received from the BS according to the received information about whether the NLP or the modulo operation is performed.

The information regarding whether the NLP or the modulo operation is performed may include location information regarding a resource in which the non-linear precoding is performed.

The performance information may include information regarding whether the terminal to support a spatial multiplexing, and the obtaining may include obtaining the control signal and the data signal by performing the modulo operation in response to the terminal supporting the spatial multiplexing.

In accordance with another aspect of the disclosure, a BS of transmitting and receiving a signal in a wireless communication system is provided. The BS includes a transceiver, and a processor coupled with the transceiver and configured to determine whether each of at least one terminal connected to the BS supports NLP or a modulo operation, determine a plurality of signals that are overlapping-transmitted in a time-frequency resource region from among a control signal, a RS, and a data signal transmitted from the BS, based on whether the at least one terminal supports the NLP or the modulo operation, and control the transceiver to transmit, to each of the at least one terminal, information about whether the NLP or the modulo operation is performed in a resource where the plurality of signals are transmitted.

The processor may be configured to determine the plurality of signals that are overlapping-transmitted from among the control signal, the RS, and the data signal, of a terminal supporting NLP from among the at least one terminal.

The processor may be configured to determine a rate matching type of a terminal supporting NLP among the at least one terminal, and determine signals that are overlapping-transmitted with the data signal among the control signal and the RS, in response to the rate matching type supporting NLP.

The processor may be configured to in response to a slot, in which a use of the rate matching type is indicated, being ahead of a slot, in which the RS and the data signal are overlapping-transmitted, determine the signal that are overlapping-transmitted with the data signal among the control signal and the RS.

The processor may be configured to determine a RS multiplexing type of a terminal supporting the NLP among the at least one terminal, and determine signals that are overlapping-transmitted with the data signal among the control signal and the RS, in response to the RS multiplexing type supporting NLP.

The processor may be configured to in response to a slot, in which a use of the RS multiplexing type is indicated, being ahead of a slot, in which the RS and the data signal are overlapping-transmitted, determine the signal that are overlapping-transmitted with the data signal among the control signal and the RS.

The processor may be configured to determine whether to perform the non-linear precoding through an upper layer signaling, and control the transceiver to transmit information of a resource, in which the NLP is performed, through a L1 signaling.

In accordance with another aspect of the disclosure, a terminal of transmitting and receiving a signal in a wireless communication system is provided. The terminal includes transceiver, and a processor coupled with the transceiver and configured to control the transceiver to transmit, to a BS, performance information regarding whether NLP or a modulo operation is supported and to receive, from the BS, information regarding whether the NLP or the modulo operation is performed in a predetermined resource in a time-frequency resource region determined based on the performance information, and obtain one of a control signal, a RS, or a data signal transmitted to the terminal by performing the modulo operation on a signal received from the BS according to the received information about whether the NLP or the modulo operation is performed.

The information regarding whether the NLP or the modulo operation is performed may include location information regarding a resource in which the non-linear precoding is performed.

The performance information may include information regarding whether the terminal to support a spatial multiplexing, and the obtain may include obtaining the control signal and the data signal by performing the modulo operation in response to the terminal supporting the spatial multiplexing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram illustrating SRS antenna switching of an NR system according to an embodiment of the disclosure;

FIG. 6 is a diagram illustrating channel state information reference signal (CSI-RS) configuration of an NR system according to an embodiment of the disclosure;

FIG. 19 is a diagram illustrating an application method when an LTE terminal and an NR terminal coexist according to an embodiment of the disclosure;

Throughout the drawings, it should be noted that like reference numbers are used to depict the same or similar elements, features, and structures.

DETAILED DESCRIPTION

Figure 1:
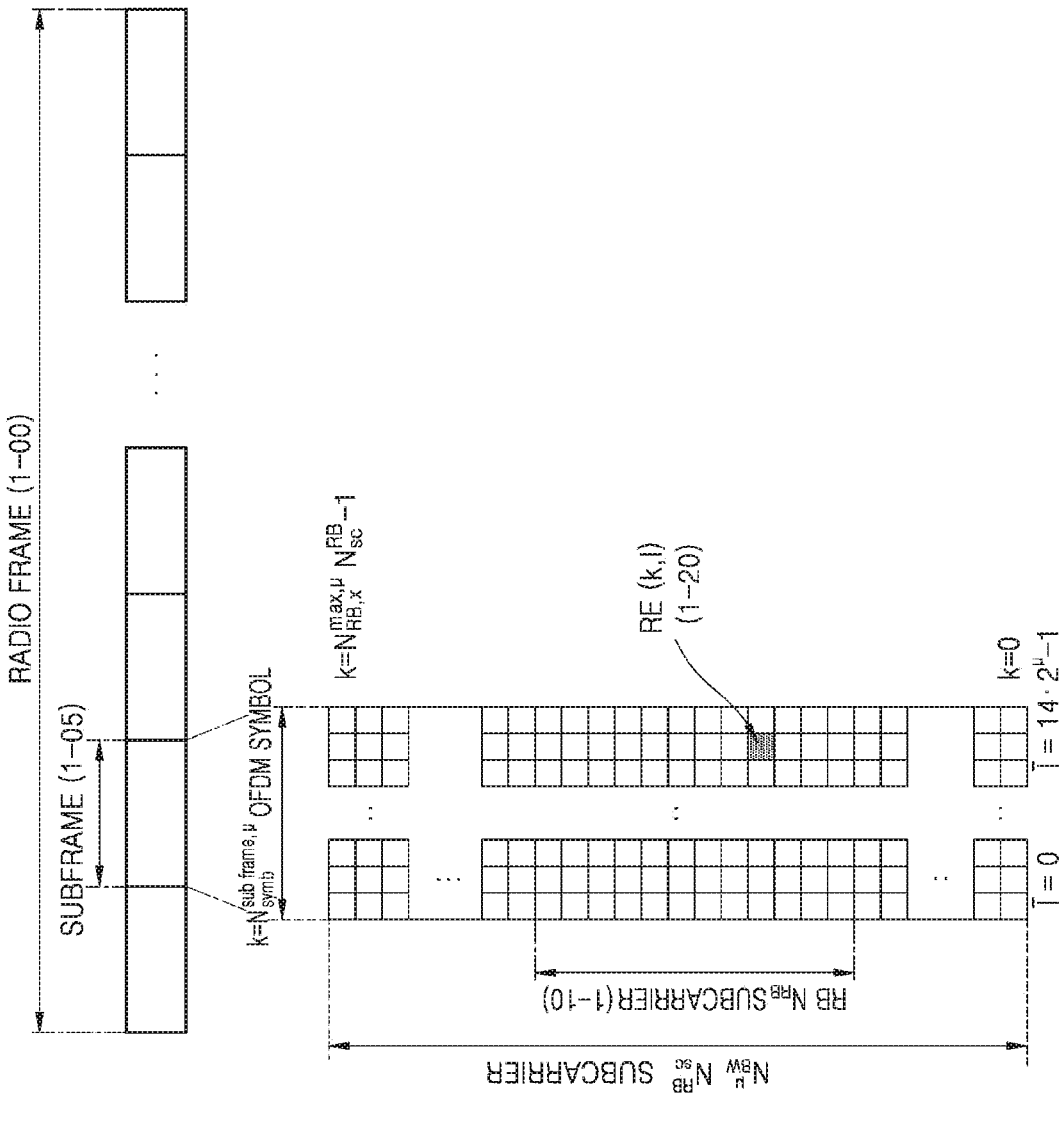
FIG. 1 is a diagram illustrating a basic structure of a time-frequency domain that is a radio resource region of a 5$^{th}$ generation (5G) or new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Wireless communication systems have evolved into broadband wireless communication systems capable of providing high-speed, high-quality packet data services, in accordance with communication standards, such as 3$^{rd}$ generation partnership project high speed packet access (3GPP HSPA), long term evolution (LTE), evolved universal terrestrial radio access (E-UTRA), LTE-advanced (LTE-A), 3GPP2 high rate packet data (HRPD), ultra-mobile broadband (UMB), and 802.16e of the Institute of Electrical and Electronics Engineers (IEEE), beyond early voice-oriented services. In addition, 5$^{th}$ generation (5G) or new radio (NR) communication standards for 5G wireless communication systems have been made.

In an LTE system that is one of the representative broadband wireless communication systems, orthogonal frequency division multiplexing (OFDM) is adopted for a downlink (DL) and single carrier-frequency division multiple access (SC-FDMA) is adopted for an uplink (UL). The UL refers to a radio link through which a terminal (e.g., user equipment (UE) or a mobile station (MS)) transmits data or a control signal to a base station (BS) (e.g., an eNode B), and the DL refers to a radio link through which the BS transmits data or a control signal to the terminal. According to a multiple access scheme, data of respective users or control information may be discriminated from each other by allocating and operating time-frequency resources so as to prevent the time-frequency resources for carrying the data or control information for each user from overlapping each other, that is, to establish orthogonality.

An LTE or NR system adopts hybrid automatic repeat request (HARQ) in which, when a decoding failure occurs during initial transmission, the data is retransmitted in a physical layer. In HARQ, when a receiver does not accurately decode data, the receiver may transmit information (negative acknowledgement (NACK)) for notifying a transmitter about a decoding failure and the transmitter may retransmit the data in a physical layer. The receiver may combine the data retransmitted by the transmitter with the data with the decoding failure to improve data reception performance. In addition, when the receiver accurately decodes data, the receiver may transmit information (acknowledgement (ACK)) for notifying the transmitter about a decoding success and the transmitter may transmit new data.

Throughout the disclosure, the expression "at least one of a, b or c" indicates only a, only b, only c, both a and b, both a and c, both b and c, all of a, b, and c, or variations thereof.

FIG. 1 is a diagram illustrating a basic structure of a time-frequency domain that is a radio resource domain of a 5G or NR system according to an embodiment of the disclosure.

Referring to FIG. 1, in the radio resource domain, the horizontal axis represents a time domain and the vertical axis represents a frequency domain. In the time domain, a minimum transmission unit is an OFDM symbol in a DL and is an OFDM symbol or a discrete Fourier transform spread OFDM (DFT-S-OFDM) symbol in a UL, and, for a normal cyclic prefix (NCP), 14 symbols $N_{symb}^{slot}$ constitute one slot. In addition, one or more symbols may constitute one subframe 1-05 according to numerology supported by NR. A length of one subframe is 1 ms. The number of OFDM symbols or DFT-S-OFDM symbols constituting a subframe is shown in Tables 1 and 2.

Table 1 For an NCP, the number $N_{symb}^{slot}$ of OFDMs per slot

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 2 For an extended cyclic prefix (CP), the number $N_{slot}^{symb,\mu}$ of OFDM symbols per slot

TABLE 2

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the frequency domain, a minimum transmission unit is a subcarrier, and an entire system transmission bandwidth (BW) may include $N_{RB,x}^{max,\mu} N_{SC}^{RB}$ subcarriers in total. The value $N_{RB,x}^{max,\mu}$ in a UL and a DL is shown in Table 3. $N_{SC}^{RB}$ that is a resource block (RB) 1-10 may include 12 consecutive subcarriers. A basic unit of a resource in the time-frequency domain is a resource element (RE) 1-20 and may be defined by an OFDM/DFT-S-OFDM symbol index and a subcarrier index.

TABLE 3

| μ | $N_{RB,DL}^{min,\mu}$ | $N_{RB,DL}^{max,\mu}$ | $N_{RB,UL}^{min,\mu}$ | $N_{RB,UL}^{max,\mu}$ |
|---|---|---|---|---|
| 0 | 20 | 275 | 24 | 275 |
| 1 | 20 | 275 | 24 | 275 |
| 2 | 20 | 275 | 24 | 275 |
| 3 | 20 | 275 | 24 | 275 |
| 4 | 20 | 138 | 24 | 138 |
| 5 | 20 | 69 | 24 | 69 |

In order to flexibly deal with required DL and UL capacity which varies according to an environment, such as a time or an operation scenario, the NR system supports various slot structures.

Figure 2:
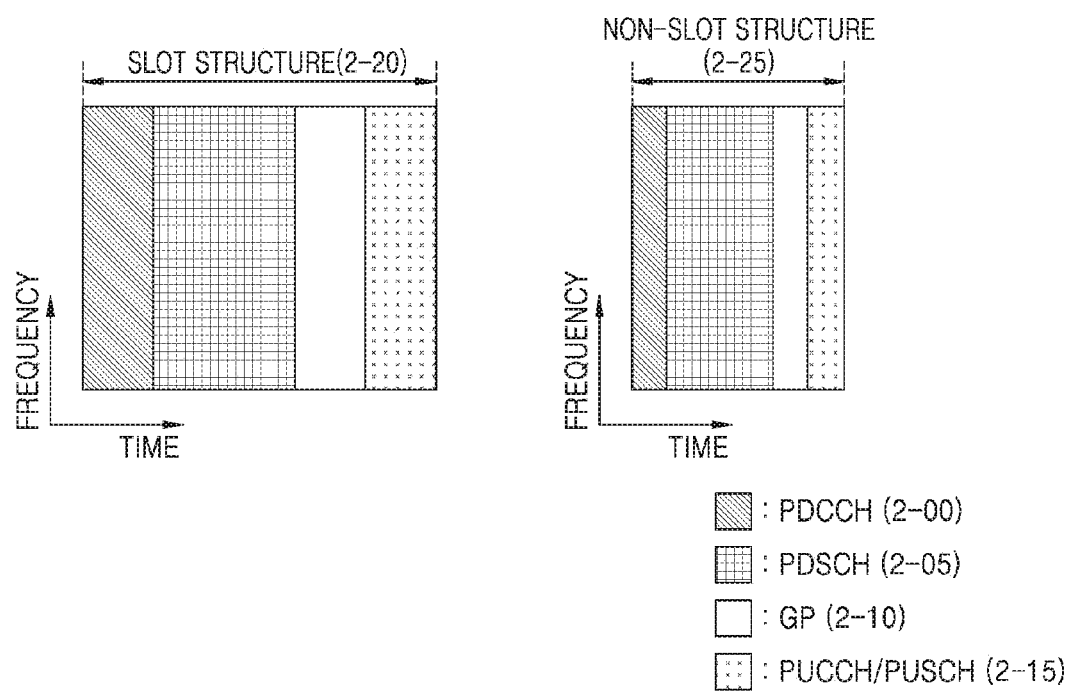
FIG. 2 is a diagram illustrating various slot structures in an NR system according to an embodiment of the disclosure.

FIG. 2 is a diagram illustrating various slot structures in an NR system according to an embodiment of the disclosure.

Referring to FIG. 2, slots having various lengths may be set to terminals in NR, and a set value may include at least one value from among a slot structure 2-20 including 14 or 7 OFDM symbols and a non-slot structure 2-25 including 1, 2, . . . , or 7 OFDM symbols.

The term "non-slot structure" is merely an example and may actually be referred to as a mini-slot structure or a short slot structure. A frequency/time resource unit set to a slot structure or a non-slot structure may be divided into a DL-only structure, a UL/DL mixed structure (similar to an LTE special subframe structure), and a UL-only structure, especially along a time axis. The present embodiment of the disclosure will be described on the assumption that the UL/DL mixed structure that may be a most common structure is used (and the DL-only structure or the UL-only structure may be considered as a special case of the UL/DL mixed structure). In the UL/DL mixed structure, at least one of a DL part, a guard period (GP) 2-10, or a UL part may be included in one slot or non-slot structure. The DL part may include at least one of a physical DL control channel (PDCCH) 2-00, a physical DL shared channel (PDSCH) 2-05, or a DL reference signal (RS), such as a channel state information reference signal (CSI-RS) or a DL demodulation reference signal (DL DMRS). Likewise, the UL part may include at least one of a physical UL control channel (PUCCH), a physical UL shared channel (PUSCH) 2-15, or a UL RS, such as a sounding reference signal (SRS) or a UL DMRS. The guard period is a period necessary for DL-to-UL switching. Because a terminal does not need to perform data transmission/reception during the guard period, the terminal may perform operations for UL-to-DL switching, for example, timing alignment or radio frequency (RF) chain switching.

DL control information may be transmitted in first N OFDM symbols in a subframe. In general, N={1, 2, 3}. Accordingly, the value N may vary for each subframe according to the amount of control information to be transmitted in a current subframe. The control information may include a control channel transmission interval indicator indicating how many OFDM symbols the control information is transmitted through, scheduling information for DL data or UL data, a HARQ ACK/NACK signal, and the like.

In an LTE or NR system scheduling information for DL data or UL data may be transmitted from a BS to a terminal by using DL control information (DCI). The DCI defines various formats and operates by applying a predetermined DCI format according to whether the scheduling information is scheduling information for UL data (UL grant) or DL data (DL grant), whether the DCI is compact DCI having small-size control information, whether spatial multiplexing using multiple antennas is applied, and whether the DCI is DCI for power control. For example, LTE DCI format 1 for scheduling control information for DL data (DL grant) includes at least the following control information.

Resource allocation type 0/1 flag: indicates whether a resource allocation type is type 0 or type 1. The type 0 involves allocating resources in the unit of RB group (RBG) by applying a bitmap scheme. In an LTE system, a basic unit of scheduling is an RB expressed by time and frequency domain resources, and an RBG includes a plurality of RBs and is used as a basic unit of scheduling in the type 0. The type 1 involves allocating a specific RB in an RBG.

RB assignment: indicates an RB allocated for data transmission. A resource to be expressed is determined according to a system BW and a resource allocation scheme.

Modulation and coding scheme (MCS): indicates a modulation scheme used for data transmission and a size of a transport block that is data to be transmitted.

HARQ process number: indicates a process number of HARQ.

New data indicator: indicates whether transmission is HARQ initial transmission or retransmission.

Redundancy version: indicates a redundancy version of HARQ.

Transmit power control (TPC) command for PUCCH: indicates a TPC command for a PUCCH that is a UL control channel.

Likewise, NR DCI format 1_0 or NR DCI format 1_1 that is scheduling control information for DL data (DL grant) may include at least the following control information.

DCI format indicator: DL DCI is always set to 1.

Frequency domain resource assignment: indicates frequency domain resource assignment information. In the DCI format 1_0, a resource is set in an initial BW part in a common search space, and a resource is set in an activated BW part in a UE specific search space.

Time domain resource assignment: indicates time domain resource assignment information.

virtual RB (VRB)-to-physical RB (PRB) mapping: indicates whether mapping from a VRB to a PRB is interleaved mapping or non-interleaved mapping by using 1 bit.

MCS: indicates a modulation scheme used for data transmission and a size of a transport block that is data to be transmitted.

HARQ process number: indicates a process number of HARQ.

New data indicator: indicates whether transmission is HARQ initial transmission or retransmission.

Redundancy version: indicates a redundancy version of HARQ.

TPC command for PUCCH: indicates a TPC command for a PUCCH that is a UL control channel.

DCI may be transmitted through a physical DL control channel (PDCCH) (or control information) or an enhanced PDCCH (EPDCCH) (or enhanced control information) after undergoing a channel coding and modulation process.

In general, DCI is independently scrambled by a radio network temporary identifier (RNTI) (or a terminal identifier) for each terminal, is added with a cyclic redundancy check (CRC), is channel-coded, and then is transmitted as an independent PDCCH. In a time domain, a PDCCH may be mapped and transmitted during a control channel transmission interval. A frequency domain mapping location of the PDCCH is determined by an identifier (ID) of each terminal and is spread through an entire system transmission band.

DL data may be transmitted through a physical DL shared channel (PDSCH) that is a physical channel for DL data transmission. The PDSCH is transmitted after a control channel transmission interval, and scheduling information, such as a specific mapping location in a frequency domain and a modulation scheme is transmitted by DCI transmitted through a PDCCH.

A BS may notify a terminal about a modulation scheme applied to a PDSCH to be transmitted and a transport block size (TBS) of data to be transmitted, by using a 5-bit MCS in control information constituting DCI. The TBS corresponds to a size of a TB to be transmitted by the BS, before channel coding for error correction is applied.

Figure 3:
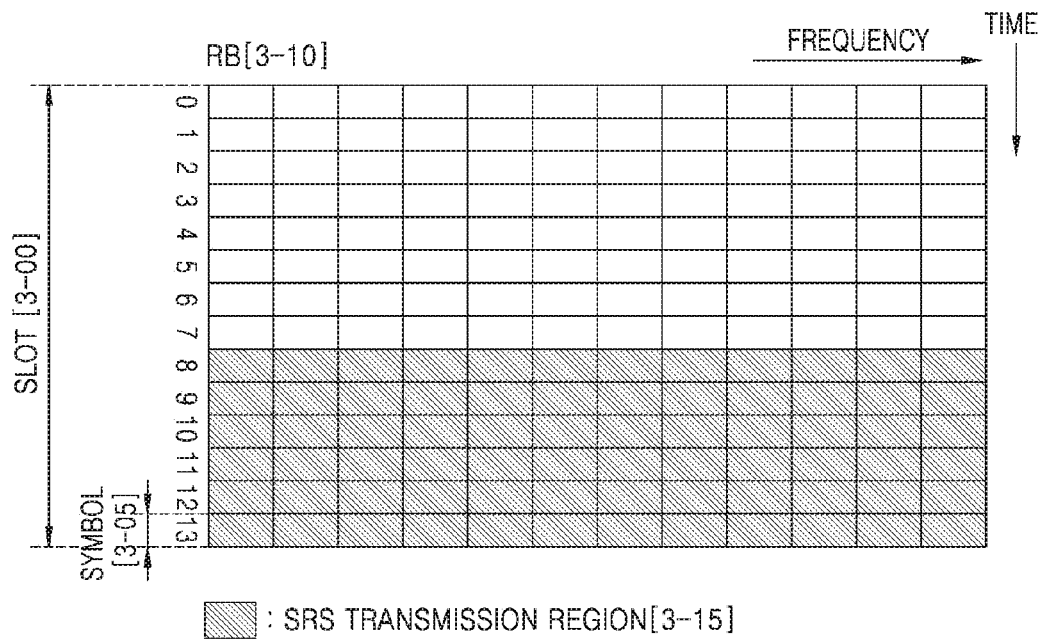
FIG. 3 is a diagram illustrating an uplink (UL) transmission structure of a 5G or NR system according to an embodiment of the disclosure.

FIG. 3 is a diagram illustrating a UL transmission structure of a 5G or NR system according to an embodiment of the disclosure.

Referring to FIG. 3, a transmission basic unit of a 5G or NR system may be a slot 3-00, and when a general CP length is assumed, each slot may include 14 symbols 3-05 and one symbol may correspond to one UL waveform (CP-OFDM or DFT-S-OFDM) symbol.

An RB 3-10 may be a resource allocation unit corresponding to one slot in a time domain and may include 12 subcarriers in a frequency domain.

A UL structure may be roughly divided into a data region and a control region. Unlike in an LTE system, in the 5G or NR system, the control region may be set at an arbitrary location of a UL and may be transmitted. The data region includes a series of communication resources including data, such as a packet and voice transmitted to each terminal, and corresponds to remaining resources other than the control region in a subframe. The control region includes a series of communication resources for DL channel quality report from each terminal, reception ACK/NACK for a DL signal, UL scheduling request, and the like.

The terminal may simultaneously transmit its data and control information in the data region and the control region. Symbols that may allow periodic SRS transmission of the terminal in one slot may be last six symbols 3-15, and may be transmitted through a data transmission band in the frequency domain. However, this is merely an example, and symbols that may allow SRS transmission may be transmitted through another time interval or frequency band. When RBs that may allow SRS transmission are transmitted in the frequency domain, the RBs may be transmitted as a multiple of 4 RBs (up to 272 RBs).

In addition, the number N of SRS symbols in the 5G or NR system may be set to 1, 2, or 4, and consecutive symbols may be transmitted. In addition, repeated transmission of SRS symbols is allowed in the 5G or NR system. Specifically, a repetition transmission factor 'r' of the SRS symbols may be set to r∈ {1,2,4}, where r≤N. For example, when one SRS antenna is mapped to one symbol and is transmitted, up to 4 symbols may be repeatedly transmitted. In contrast, 4 different antenna ports may be mapped to 4 different symbols and may be transmitted. In this case, because each antenna port is mapped to one symbol, repeated transmission of SRS symbols is not allowed.

For LTE/NR, an SRS may be set based on the following higher layer signaling information (or a subset thereof).

BandwidthConfig: sets SRS BW information. An accurate value indicated by each code point may vary according to a UL system BW value.

SubframeConfig (or ConfigIndex): sets SRS transmission periodicity and transmission offset values. An accurate value indicated by each code point may vary according to whether a system is a frequency division duplex (FDD) system or a time division duplex (TDD) system.

ackNackSRS-SimultaneousTransmission: indicates whether ACK/NACK and SRSs are simultaneously transmitted.

MaxUpPts: indicates whether frequency position initialization of SRS transmission occurs in UpPTS.

Hopping: indicates whether SRS frequency hopping occurs and a hopping position and method by using 2-bit information.

Frequency domain position: indicates a frequency domain position of SRS transmission.

Duration: indicates whether periodic SRS transmission occurs.

Transmission comb: indicates a comb offset value during SRS transmission.

Cyclic shift: indicates a cyclic shift value during SRS transmission.

Antenna port: indicates the number of SRS antenna ports used during SRS transmission. In LTE, 1, 2, or 4 ports may be supported.

In an LTE/LTE-A system, periodic and aperiodic SRS transmission may be supported based on the above configuration information. In an NR system, additional information, such as activation/deactivation signaling for SRS resources other than the above configuration information may be used, and periodic, semi-persistent, and aperiodic SRS transmission may be supported. According to an SRS transmission type, for example, according to periodic, semi-persistent, or aperiodic SRS transmission, some of the above configuration information may be omitted.

An SRS may include a constant amplitude zero auto correlation (CAZAC) sequence. CAZAC sequences of SRSs transmitted from a plurality of terminals have different cyclic shift values. In addition, CAZAC sequences generated through cyclic shift from one CAZAC sequence have a characteristic in that they have a zero correlation value with sequences having cyclic shift values different therefrom. Accordingly, SRSs simultaneously allocated to the same frequency domain may be divided from one another according to a CAZAC sequence cyclic shift value set by a BS by using the characteristic.

SRSs of a plurality of terminals may be divided according to a frequency position as well as a cyclic shift value. The frequency position may be divided by SRS subband unit allocation or Comb. In the 5G or NR system, Comb2 and Comb4 may be supported. In Comb2, one SRS may be allocated only to even or odd-numbered subcarriers in an SRS subband. In this case, each of the even or odd-numbered subcarriers may constitute one Comb.

An SRS subband may be allocated to each terminal based on a tree structure. The terminal may perform hopping on an SRS allocated to each subband at each SRS transmission time. Accordingly, all transmit antennas of the terminal may transmit the SRS through an entire UL data transmission BW.

Figure 4:
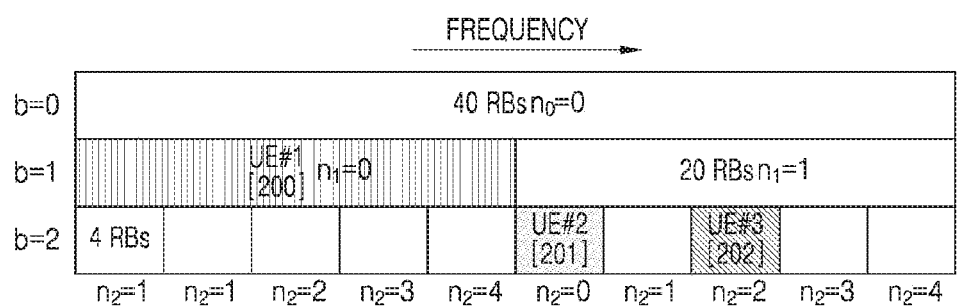
FIG. 4 is a diagram illustrating a structure in which a sounding reference signal (SRS) is allocated according to each subband according to an embodiment of the disclosure.

FIG. 4 is a diagram illustrating a structure in which an SRS is allocated according to each subband according to an embodiment of the disclosure.

Referring to FIG. 4, assuming that a data transmission band corresponds to 40 RBs in a frequency domain, an SRS is allocated to each terminal based on a tree structure set by a BS.

In FIG. 4, when a level index of the tree structure is b, a highest level (b=0) of the tree structure may include one SRS subband having a 40 RB BW. At a second level (b=1), two SRS subbands each having a 20 RB BW may be generated from the SRS subband of the highest level (b=0). Accordingly, two SRS subbands may exist in an entire data transmission band of the second level (b=1). At a third level (b=2), five SRS subbands each having a 4 RB BW may be generated from one SRS subband of the second level (b=1) and ten SRS subbands each having a 4 RB BW may exist in one level.

The tree structure may have various level numbers, SRS subband sizes, and SRS subband numbers per level according to configuration information of the BS. The number of SRS subbands at a level 'b' generated from one SRS subband of a higher level may be defined as Nb, and an index of Nb SRS subbands may be defined as nb={0, ... , Nb-1}. As a subband per level varies, a terminal may be allocated according to a subband per level as shown in FIG. 4. For example, a terminal 1 200 may be allocated to a first SRS subband ($n_1$=0) from among two SRS subbands each having a 20 RB BW at the b=1 level, and a terminal 2 201 and a terminal 3 202 may be respectively allocated to a first SRS subband ($n_2$=0) and a third SRS subband ($n_2$=2) under a second SRS subband having a 20 RB BW. Through such processes, a terminal may achieve simultaneous SRS transmission through multiple component carriers (CCs) and SRS transmission in a plurality of SRS subbands in one CC.

As described above, a 5G or NR terminal supports a single user-multiple input and multiple output (SU-MIMO) method and includes up to 4 transmit antennas. In addition, the 5G or NR terminal may simultaneously transmit SRSs in a plurality of CCs or a plurality of SRS subbands in a CC. In the 5G or NR system, unlike in an LTE system, various numerologies may be supported, SRS transmission symbols may be set in various ways, and repeated SRS transmission may be allowed.

A 5G or NR system may not only support various numerologies but also support a plurality of SRS transmission OFDM symbols and a repletion factor during SRS transmission. Accordingly, it is necessary to count SRS transmission. SRS transmission counting may be used in various ways. For example, SRS transmission counting may be used to support antenna switching according to SRS transmission. In detail, which SRS corresponding to which antenna is transmitted at which SRS transmission time in which band may be determined by SRS transmission counting.

FIG. 5 is a diagram illustrating SRS antenna switching of an NR system according to an embodiment of the disclosure.

Referring to FIG. 5, SRS antenna switching, for example, 1Tx switching (in the case of UE with 1T2R) 5-00, 2Tx (in the case of UE with 2T4R) 5-05, and 4Tx switching (in the case of UE with 1T4R) 5-10, may be supported. In the 1Tx switching 5-00, a BS may set two 1-symbol SRS resources to two symbols and may transmit a first SRS port and a second SRS port, or may set two 2-symbol SRS resources to four symbols and may transmit a first SRS port and a second SRS port.

In the 2Tx switching 5-05, the BS may set two 1-symbol SRS resources to two symbols and may transmit first and third SRS ports to a first SRS resource and may transmit second and third SRS ports to a second SRS resource. In another embodiment of the disclosure, in the 2Tx switching

5-05, the BS may set two 2-symbol SRS resources to four symbols and may transmit first and third SRS ports to a first SRS resource and may transmit second and third SRS ports to a second SRS resource.

In the 4Tx switching 5-10, SRS repetition (same SRS port transmission using two or more symbols) may not be supported, and the BS may set four 1-symbol SRS resources to four symbols and may respectively transmit first through fourth SRS ports to SRS resources.

In NR, the BS and a terminal may obtain DL CSI based on CSI-RS other than an SRS. Each CSI-RS resource configuration set by a higher layer may include at least the following detailed configuration information.

Non-zero-power (NZP)-CSI-RS-Resource ConfigID: IDs of CSI-RS resource configurations NrofPorts: the number of CSI-RS ports included in a corresponding CSI-RS resource CSI-RS-timeConfig: transmission periodicity and slot offset of the corresponding CSI-RS resource CSI-RS-ResourceMapping: a position of an OFDM symbol in a slot of the corresponding CSI-RS resource and a position of a subcarrier in a PRB CSI-RS-Density: frequency density of the corresponding CSI-RS CDMType: a code division multiplexing (CDM) length and a CDM RE pattern of the corresponding CSI-RS CSI-RS-FreqBand: a transmission BW of the corresponding CSI-RS and a start position Pc: a ratio between PDSCH energy per RE (EPRE) and NZP CSI-RS EPRE Pc-SS: a ratio between synchronization signal (SS)/physical broadcast channel (PBCH) block EPRE and NZP CSI-RS EPRE CSI-RS-ResourceRep: associated with NZP CSI-RS resources included in one resource set. When CSI-RS-ResourceRep is 'ON', the terminal may assume that the same spatial domain transmission filter is applied to NZP CSI-RS resources included in a resource set (that is, the BS uses the same transmission beam) and may recognize that the NZP CSI-RS resources have the same CSI-RS port number and periodicity. When CSI-RS-ResourceRep is 'OFF', the terminal may not assume that the same spatial transmission filter is applied to NZP CSI-RS resources included in a resource set (that is, the BS uses the same transmission beam) and may not recognize that the NZP CSI-RS resources have the same CSI-RS port number and periodicity.

In NR, one CSI-RS port number from among {1, 2, 4, 8, 12, 16, 24, 32} may be set to one CSI-RS resource, and a different degree of configuration freedom according to a CSI-RS port number set to a CSI-RS resource may be supported. Table 4 shows a CSI-RS density that may be set according to an NR CSI-RS port number, a CSI-RS OFDM symbol number (N), a frequency axis RE number (Y) and a time axis RE number (Z) of a CSI-RS component RE pattern, and a CDM length and type. The CSI-RS component RE pattern that is a basic unit of the CSI-RS resource may include YZ REs including Y adjacent REs along a frequency axis and Z adjacent REs along a time axis. Referring to Table 4, in NR, a different degree of frequency axis configuration freedom may be supported according to a CSI-RS port number set to a CSI-RS resource.

This will be described with reference to FIG. 6.

FIG. 6 is a diagram illustrating CSI-RS configuration of an NR system according to an embodiment of the disclosure.

Referring FIG. 6, in the case of 1 port, a CSI-RS RE position may be set without the limitation of subcarriers in a PRB and may be designated by using a 12-bit bitmap 6-00. In the case of {2, 4, 8, 12, 16, 24, 32} port and Y=2, a CSI-RS RE position may be set for every two subcarriers in the PRB and may be designated by using a 6-bit bitmap 6-05. In the case of 4 port and Y=4, a CSI-RS RE position may be set for every four subcarriers in the PRB and may be designated by using a 3-bit bitmap 6-10. Along a time axis, up to four CSI-RS RE positions may be designated from among 14 OFDM symbols in one slot, and to this end, a BS may set up to two symbol start positions through higher layer signaling.

TABLE 4

| X | Density [RE/RB/port] | N | (Y, Z) | CDM |
|---|---|---|---|---|
| 1 | 3, 1, 1/2 | 1 | N.A. | No CDM |
| 2 | 1, 1/2 | 1 | (2, 1) | FD-CDM2 |
| 4 | 1 | 2 | (2, 2) | FD-CDM2 |
| 4 | 1 | 1 | (4, 1) | FD-CDM2 |
| 8 | 1 | 1 | (2, 1) | FD-CDM2 |
| 8 | 1 | 2 | (2, 2) | FD-CDM2, CDM4 (FD2, TD2) |
| 12 | 1 | 1 | (2, 1) | FD-CDM2 |
| 12 | 1 | 2 | (2, 2) | CDM4 (FD2, TD2) |
| 16 | 1, 1/2 | 2 | (2, 2) | FD-CDM2, CDM4 (FD2, TD2) |
| 24 | 1, 1/2 | 4 | (2, 2) | FD-CDM2, CDM4 (FD2, TD2), CDM8 (FD2, TD4) |
| 32 | 1, 1/2 | 4 | (2, 2) | FD-CDM2, CDM4 (FD2, TD2), CDM8 (FD2, TD4) |

FIG. 6 illustrates CSI-RS RE designation by using CSI-RS-ResourceMapping set by a higher layer as described above according to an embodiment of the disclosure.

When X=2 port, the BS may designate an RE position along a frequency axis by using the 6-bit bitmap 6-05. When the BS designates a position of a subcarrier along the frequency axis by using 2 of the 6-bit bitmap 6-05 and designates a position of an OFDM symbol along the time axis by using 9 of 6-15, a terminal may recognize that a CSI-RS is transmitted at an RE position 6-25 in a PRB 6-20.

Figure 7A:
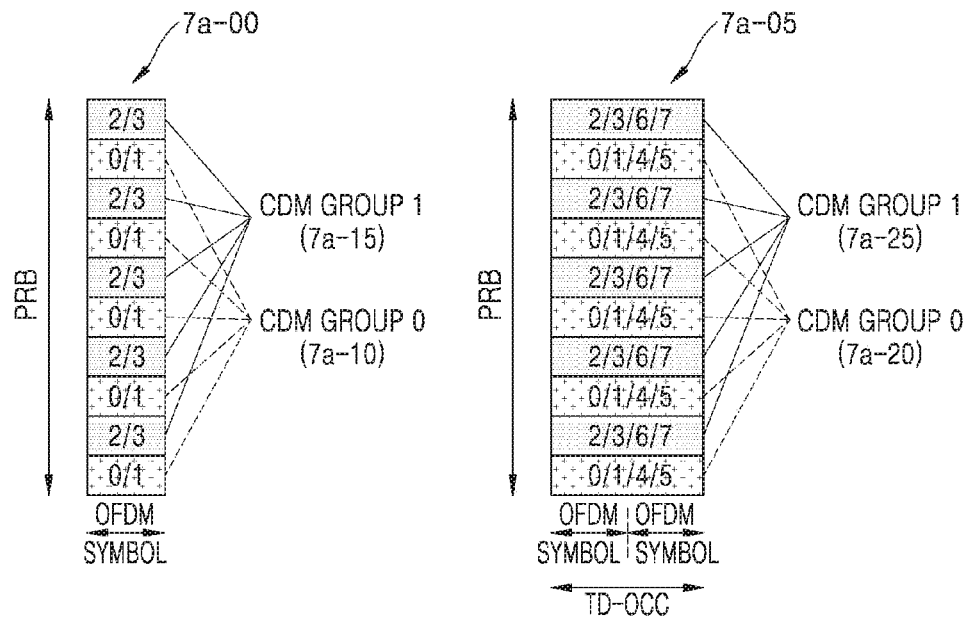
FIG. 7A is a diagram illustrating an NR demodulation reference signal (DMRS) structure according to an embodiment of the disclosure.
Figure 7B:
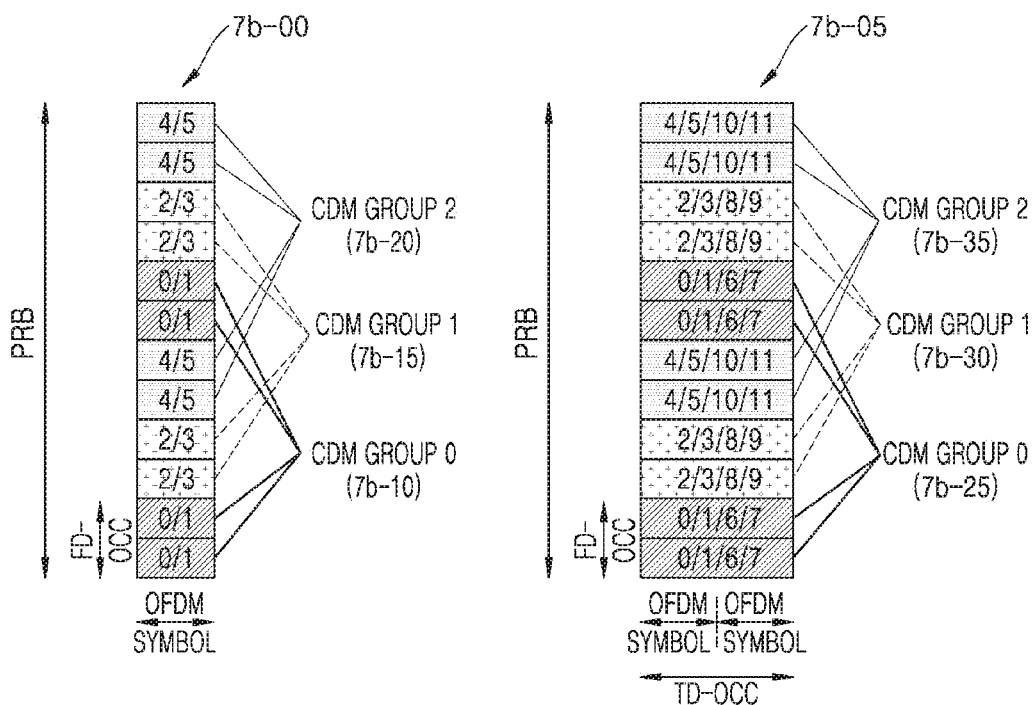
FIG. 7B is a diagram illustrating an NR DMRS structure according to an embodiment of the disclosure.
Figure 7C:
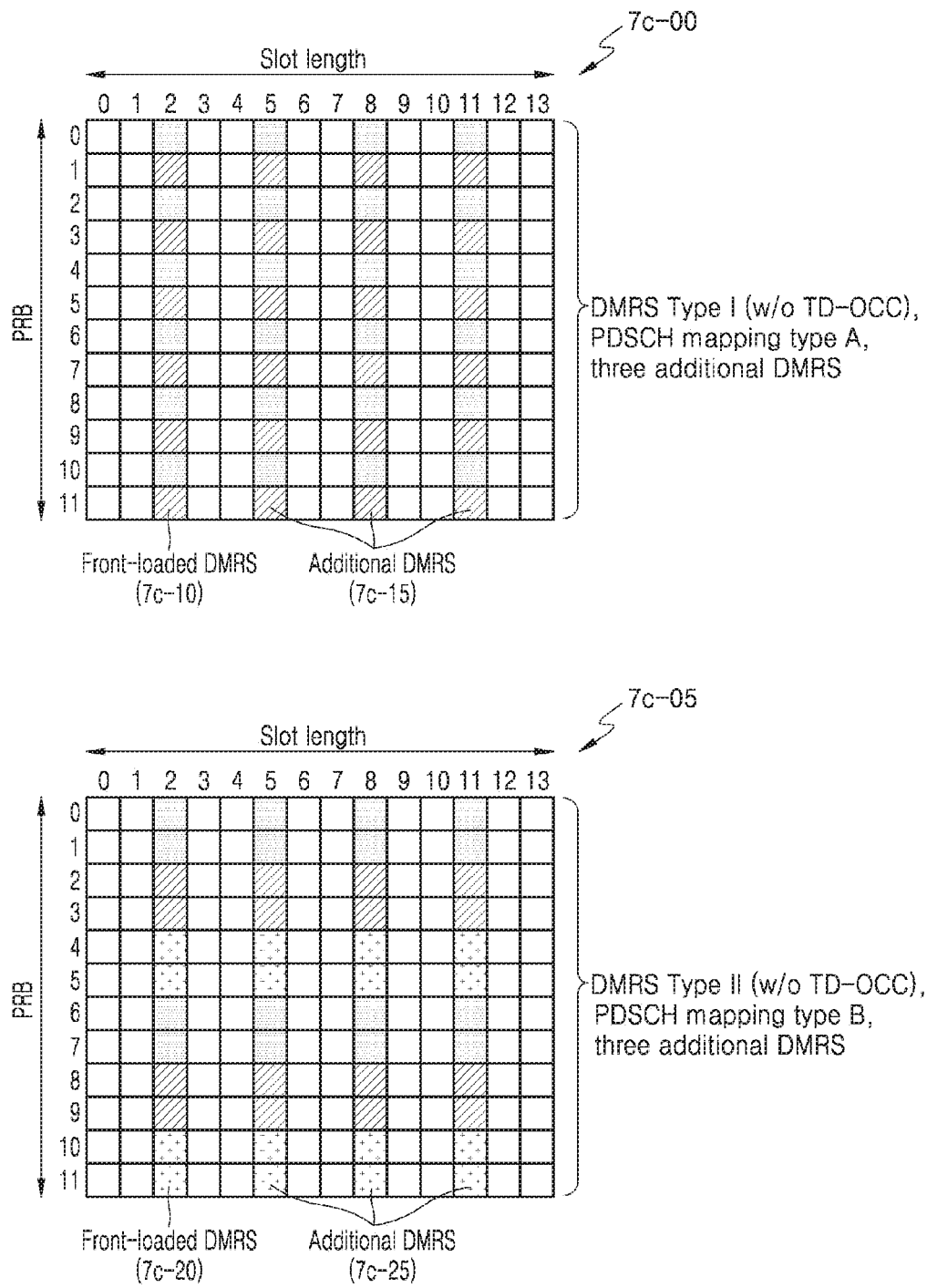
FIG. 7C is a diagram illustrating an NR DMRS structure according to an embodiment of the disclosure.

FIGS. 7A to 7C are diagrams illustrating an NR demodulation reference signal (DMRS) structure according to various embodiments of the disclosure.

Referring to FIG. 7A is a diagram illustrating DMRS RE patterns in DMRS configuration type 1. A position of an OFDM symbol in a slot of the DMRS RE patterns of FIG. 7A will be described below in detail. Referring to FIG. 7A, the DMRS configuration type 1 may have comb-type RE patterns (transmitted in even or odd-numbered subcarriers) and a DMRS may be transmitted through one OFDM symbol according to a one-symbol pattern 7a-00 or may be transmitted through two OFDM symbols according to a two-symbol pattern 7a-05. When the DMRS is transmitted through two OFDM symbols, a time-domain orthogonal cover code (TD-OCC) may be applied to two REs transmitted in the same subcarrier.

In the one-symbol pattern 7a-00, up to four DMRS ports may be transmitted together at a time. In the one-symbol pattern 7a-00, first and second ports 0/1 may be included in a first CDM group 7a-10 and third and fourth ports 2/3 may be included in a second CDM group 7a-15.

In the two-symbol pattern 7a-05, up to eight DMRS ports may be transmitted together at a time. In the two-symbol pattern 7a-05, first, second, fifth, and sixth ports 0/1/4/5 may be included in a first CDM group 7a-20 and third, fourth, seventh, and eighth ports 2/3/6/7 may be included in a second CDM group 7a-25. Although ports are mapped to port numbers 0, 1, . . . , and 8 for convenience of explanation in the above, ports may actually be mapped to appropriate DMRS port numbers, such as 1000, 1001, . . . , and 1008.

Referring to FIG. 7B, DMRS RE patterns in DMRS configuration type 2 are illustrated. A position of an OFDM symbol in a slot of the DMRS RE patterns of FIG. 7B will be described below in detail. Referring to FIG. 7B, the DMRS configuration type 2 may have OCC type RE patterns (transmitted in two or more adjacent subcarriers along an frequency axis), and a DMRS may be transmitted through one OFDM symbol according to a one-symbol pattern 7b-00 or may be transmitted through two OFDM symbols according to a two-symbol pattern 7b-05. When the DMRS is transmitted through two OFDM symbols, a TD-OCC may be applied to two REs transmitted in the same subcarrier.

In the one-symbol pattern 7b-00, up to six DMRS ports may be transmitted together at a time. In the one-symbol pattern 7b-00, first and second ports 0/1 may be included in a first CDM group 7b-10, third and fourth ports 2/3 may be included in a second CDM group 7b-15, and fifth and sixth ports 4/5 may be included in a third CDM group 7b-20.

In the two-symbol pattern 7b-05, up to twelve DMRS ports may be transmitted together at a time. In the two-symbol pattern 7b-05, first, second, seventh, and eighth ports 0/1/6/7 may be included in a first CDM group 7b-25, third, fourth, ninth, and tenth ports 2/3/8/9 may be included in a second CDM group 7b-30, and fifth, sixth, eleventh, and twelfth ports 4/5/10/11 may be included in a third CDM group 7b-35. Although ports are mapped to port numbers 0, 1, . . . , and 11 for convenience of explanation in the above, ports may actually be mapped to appropriate DMRS port numbers, such as 1000, 1001, . . . , and 1011.

Referring to FIG. 7C, front-loaded DMRS and additional DMRS OFDM symbol locations in NR are illustrated. In the NR, in DMRS configuration type 1 7c-00 and DMRS configuration type 2 7c-05, OFDM symbol locations for front-loaded and additional DMRSs may be supported. OFDM symbol locations for front-loaded DMRSs 7c-10 and 7c-20 may be classified according to a PDSCH mapping type.

In PDSCH mapping type A, for a PDCCH, first two OFDM symbols or three OFDM symbols of a slot may be transmitted, and a front-loaded DMRS may be set to be located in one of third and fourth OFDM symbols.

In PDSCH mapping type B, a PDCCH may be located in all OFDM symbols in a slot, and a front-loaded DMRS is located in a first OFDM symbol in a PDSCH region allocated to a terminal in one slot. A BS may set and transmit an additional DMRS to the terminal considering a channel change according to time. The BS may set 0 to three additional DMRSs according to a given condition, and FIG. 7C illustrates set locations of three additional DMRSs 7c-15 and 7c-25.

In an LTE/LTE-A system, simple linear precoding (LP), such as a matched filter (MF) precoder, a zero-forcing (ZF) precoder, or a minimum mean square error (MMSE) precoder has been mainly assumed considering the complexity of a BS and a terminal, and even for a terminal, a linear receiver, such as an MMSE receiver or a successive interference cancellation (MMSE-SIC) receiver has been assumed.

Although structures of LP and a receiver for the same are simple, interference cancellation performance between signal sources is poor. Accordingly, when LP is used, data channels and RSs or control channels have to be appropriately allocated to independent time/frequency resources in order to minimize interference.

Figure 8:
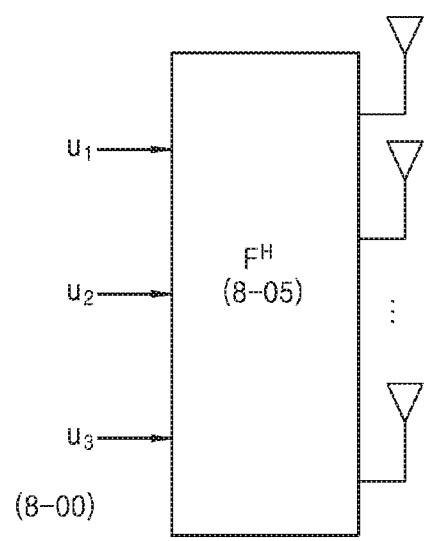
FIG. 8 is a block diagram of a linear precoder according to an embodiment of the disclosure.

FIG. 8 is a block diagram of a linear precoder according to an embodiment of the disclosure.

Referring to FIG. 8, input data streams 8-00 are simply multiplied by a linear precoder 8-05 and are transmitted to antennas. Although a linear precoder/receiver has low complexity, interference cancellation capability may be low and optimal performance may not be obtained.

In an NR system, the complexity of a BS and a terminal may increase and nonlinear precoding (NLP) and nonlinear receivers having better interference cancellation capability may be applied. Although NLP may have a larger performance gain than LP by pre-cancelling interference from a signal and sending the signal at a transmitter to achieve the same or similar performance as in the absence of interference at a receiver, an additional operation, such as a modulo operation is required at the transmitter/receiver and accurate channel estimation is required.

Figure 9:
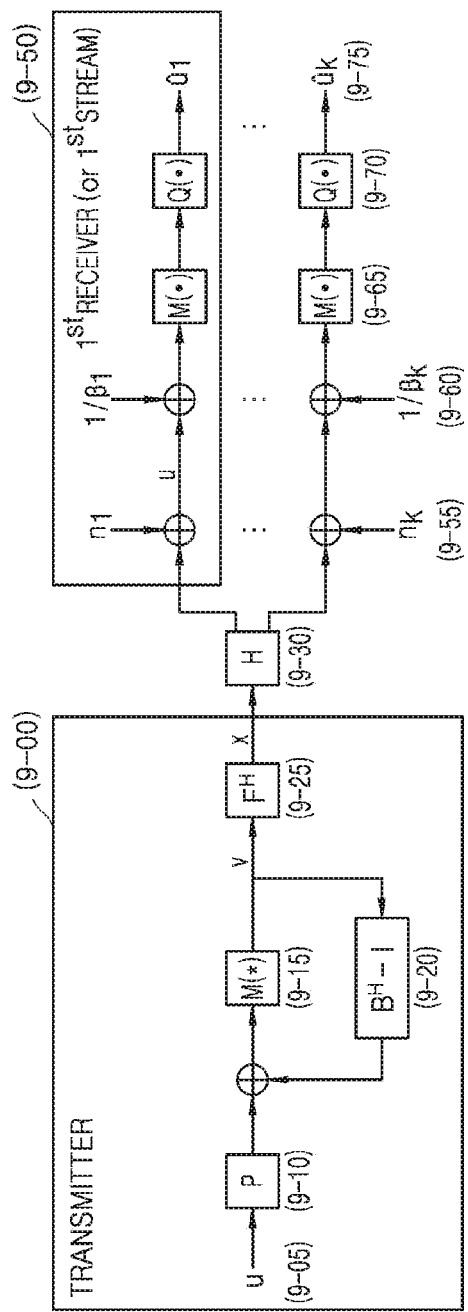
FIG. 9 is a block diagram of a transmitter and a receiver for Tomlinson-Harashima precoding (THP) that is nonlinear precoding (NLP) according to an embodiment of the disclosure.

FIG. 9 is a block diagram of a transmitter and a receiver for Tomlinson-Harashima precoding (THP) that is NLP according to an embodiment of the disclosure.

Referring to FIG. 9, a BS may re-arrange transmission symbol streams u 9-05 by using an ordering matrix P in 9-10, may pre-cancel interface in 9-20, may apply a modulo operation in 9-15, may perform LP in 9-25, and may transmit a transmission signal x. Next, each receiver (or stream) may receive a reception signal u through a channel 9-30 and noise 9-55. A receiver 9-50 may equalize a channel by estimating an effective channel gain in 9-60, may apply the same modulo operation as that applied at a transmitter 9-00 in 9-65, and may detect a symbol 9-75 by using a quantizer in 9-70.

Figure 10:
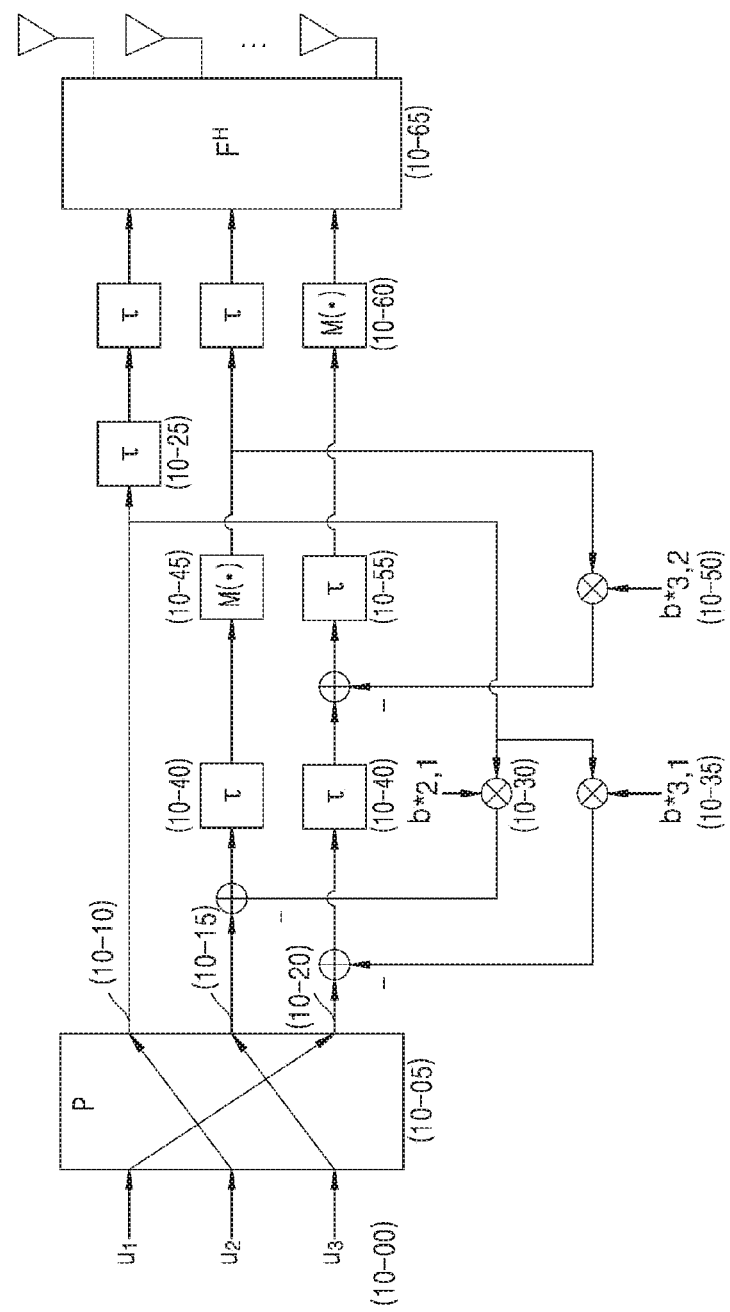
FIG. 10 is a diagram illustrating a structure of such a THP transmitter as shown in FIG. 9 according to an embodiment of the disclosure.

FIG. 10 is a diagram illustrating a structure of such a THP transmitter as shown in FIG. 9 according to an embodiment of the disclosure.

Referring to FIG. 10, an order of transmission signal streams $u_1$ through $u_3$ 10-00 may be changed by a matrix P in 10-05. In this case, the changed order may not be fixed, and may be appropriately selected by a BS according to operations described below. The BS may perform interference cancellation and a modulo operation, like in 9-20 and 9-15 of FIG. 9. In this case, when interference cancellation is simultaneously performed on all streams, many repeated operations may be required. Accordingly, a causal system as shown in FIG. 10 may be considered.

Referring to FIG. 10, for a first stream 10-10, the BS may not perform interference cancellation and a modulo operation and may apply delay 10-25 for next streams. For a second stream 10-15, the BS multiples an appropriate coefficient 10-30 to obtain a resultant value by considering the first stream 10-10 as interference, and then subtracts the resultant value from an original signal. Thereafter, the BS may apply delay 10-40 and a modulo operation 10-45. For a third stream 10-20, the BS multiplies appropriate coefficients 10-35 and 10-50 by considering both the first stream 10-10 and the second stream 10-15 as interference to obtain a resultant value, and then subtracts the resultant value from an original signal. In this case, the BS may apply delays 10-40 and 10-55 considering an operation time per stream and then may apply a modulo operation 10-60.

Although an embodiment of the disclosure in FIG. 10 is described based on three streams, the embodiment of the disclosure may be freely extended to arbitrary streams (or layers). Next, each stream to which interference cancellation and modulo operations are appropriately applied may be transmitted to each antenna port through LP 10-65.

The above THP-based example is for convenience of explanation, and in actual application, various NLP algorithms, such as vector perturbation (VP), QL-based dirty paper coding (DPC), and ZF THP may be considered.

As described above, NLP may enable a terminal to achieve the same or similar performance as in the absence of interference. In an LP-based system, because interference cancellation capability of a terminal is limited, it is necessary to prevent collision by applying strict rate matching and multiplexing rules between channels or RSs. However, high interference cancellation capability of NLP may be a good motivation for addressing such strict rate matching and multiplexing rules and sharing REs between some channels or RSs.

In NLP, interference cancellation performance between signal sources may be efficiently improved based on a modulo operation at a transmitter/receiver. When a BS accurately recognizes channel state information and interference signal information, the BS may pre-cancel a corresponding interference signal by using NLP, and thus overlapping between RSs or rate matching of a data channel may be more efficiently designed when compared to an existing system.

The disclosure may provide PDSCH rate matching and RS multiplexing methods considering NLP.

Although a 5G or NR system will be described below, an embodiment of the disclosure may also be applied to other communication systems having a similar technical background or channel type. Accordingly, it would be understood by one of ordinary skill in the art that the embodiment of the disclosure may also be applied to other communication systems through some modifications without departing from the scope of the disclosure.

To describe a method and an apparatus of the disclosure, the terms "physical channel" and "signal" used in LTE or LTE-A systems may be used. However, the teaching of the disclosure may be applied to wireless communication systems other than LTE and LTE-A systems.

The teaching of the disclosure may be applied to FDD and TDD systems.

The term "physical layer signaling" used herein is a signal transmission method of transmitting a signal from a BS to a terminal by using a DL control channel of a physical layer or from the terminal to the BS by using a UL control channel of the physical layer, and may be referred to as L1 signaling or PHY signaling.

The term "higher layer signaling" used herein is a signal transmission method of transmitting a signal from a BS to a terminal by using a DL data channel of a physical layer or from the terminal to the BS by using a UL data channel of the physical layer, and may be referred to as RRC signaling, L2 signaling, packet data convergence protocol (PDCP) signaling, or MAC control element (MAC CE).

The term "UL DCI or UL-related DCI" used herein refers to physical layer control signaling (L1 control signaling) including information necessary for UL transmission, such as UL resource configuration information and resource configuration type information, UL power control information, cyclic shift or an orthogonal cover code (OCC) of a UL RS, CSI request, SRS request, MCS information per codeword, or UL precoding information field information, such as UL grant.

Embodiment 1: PDSCH Rate Matching Method Considering NLP

As described above, the influence of interference on a terminal to which LP is applied and the influence of interference on a terminal to which NLP is applied are greatly different from each other.

Figure 11:
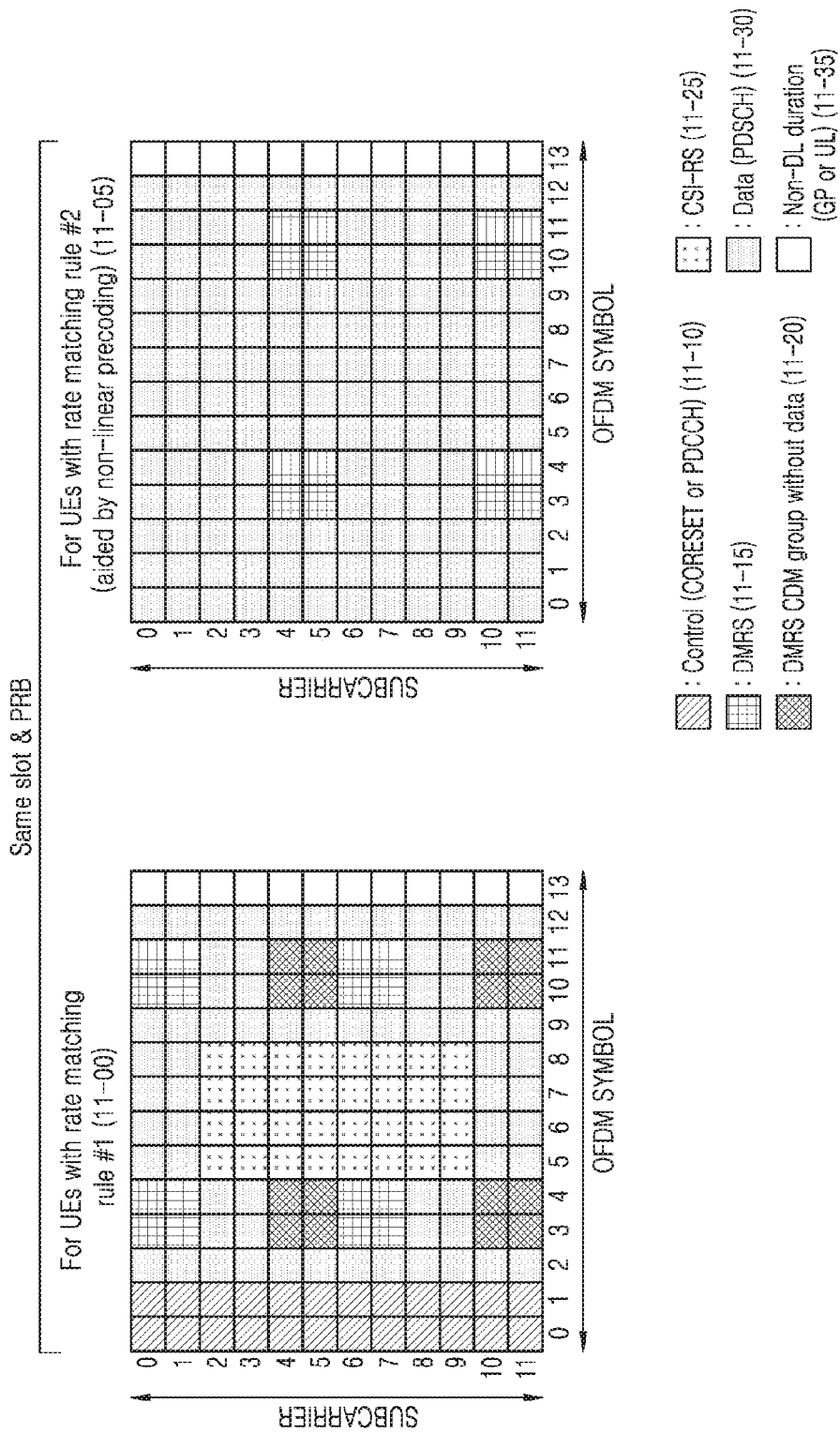
FIG. 11 is a diagram illustrating physical downlink (DL) shared channel (PDSCH) rate matching of a terminal to which linear precoding (LP) or NLP is applied according to an embodiment of the disclosure.

FIG. 11 is a diagram illustrating PDSCH rate matching of a terminal to which LP or NLP is applied according to an embodiment of the disclosure.

Referring to FIG. 11, a BS and a terminal may apply different PDSCH RE rate matching rules to multiple channels and RSs according to a specific condition, such as whether NLP is applied based on at least one rate matching rule.

Referring to FIG. 11, for a terminal 11-00 to which LP is applied, as sequentially mapping PDSCH REs from a low (or high)-index time and frequency resource, the BS may skip REs allocated to RSs or channels other than a PDSCH 11-30, such as control (control resource set (CORESET) or PDCCH) 11-10, DMRS 11-15, DMRS CDM group without data 11-20, CSI-RS 11-25, and Non-DL duration (GP or UL) 11-35 allocated to the terminal 11-00 and may sequentially map PDSCH symbols from a next time or frequency resource. Such a method of skipping specific resources and sequentially mapping PDSCH symbols may be referred to as a rate matching method.

Control, NZP CSI-RS, zero-power (ZP) CSI-RS, DMRS CDM group without data, and the like, may be shared by one or more terminals for improvement of terminal PDCCH reception performance, RS RE sharing, multiuser MIMO (MU-MIMO) transmission, and the like. A rate matching rule for a terminal or a terminal type A to which LP is applied will be referred to as rate matching type #1 for convenience of explanation.

Referring to FIG. 11, for a terminal 11-05 to which NLP is applied, another criterion for PDSCH rate matching may be applied. For a terminal to which NLP may be applied, the BS receives a signal from which interference is pre-cancelled in a transmission interval where NLP is applied, and thus rate matching for improving PDSCH reception performance or other channel and RS reception performance according to a condition may not be required.

For example, the BS may instruct a terminal through L1 signaling or RRC/MAC CE signaling to omit, in a certain DL transmission interval (e.g., in a DL slot to which NLP is applied), PDSCH rate matching for at least one channel or RS from among SS/PBCH block (SSB), PDCCH, CORESET, CSI-RS for CSI acquisition, CSI-RS for beam management, CSI-RS for tracking, CSI-RS for RRM (CSI-RS for mobility), guard period, ZP CSI-RS, phase tracking RS (PTRS), UL duration including SRS, PUCCH, and PUSCH.

For example, the BS may instruct the terminal 11-05 receiving a PDSCH transmitted by using NLP to omit rate matching for REs allocated to an RS or a channel other than the PDSCH, such as the control (CORESET or PDCCH) 11-10, the DMRS CDM group without data 11-20, the CSI-RS 11-25, and Non-DL duration (GP or UL) 11-35 and to perform rate matching for REs of the DMRS 11-15 for decoding the PDSCH.

A rate matching rule for a terminal or a terminal type B to which NLP is applied will be referred to as rate matching type #2 for convenience of explanation. Mapping of the terminal 11-05 of FIG. 11 to which NLP is applied is merely an example and a rate matching rule for some channels and RSs may be maintained, like the rate matching type #1. In the present embodiment of the disclosure, the BS may determine whether the rate matching type #2 may be applied according to UE capability signaling of a terminal.

Figure 12:
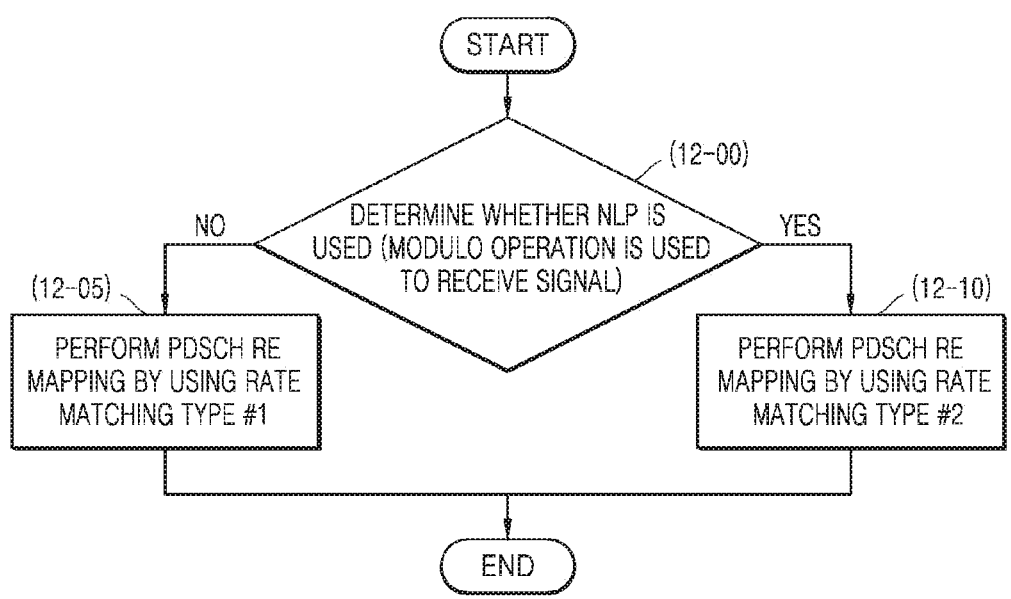
FIG. 12 is a flowchart illustrating a rate matching method according to an embodiment of the disclosure.

FIG. 12 is a flowchart illustrating a rate matching method according to an embodiment of the disclosure.

Referring to FIG. 12, in operation 12-00, a BS may determine whether a terminal uses NLP.

In operation 12-05, the BS and the terminal may use rate matching type #1 when the NLP is not used. For example, the BS may perform PDSCH RE mapping by using the rate matching type #1.

In operation 12-10, the BS and the terminal may use rate matching type #2 when the NLP is used. For example, the BS may perform PDSCH RE mapping by using the rate matching type #2.

In this case, whether the NLP is used (NLP-ON or NLP-OFF) in operation 12-00 may be expressed as whether a modulo operation is used (Modulo-ON or Modulo-OFF) or the like.

Whether the NLP is used may be 1-step set/instructed through higher layer or L1 signaling, or whether the NLP is used (NLP-ON/OFF) may be set through higher layer signaling and whether the NLP is actually applied in a designated transmission interval (e.g., a DL slot where a PDSCH allocated by L1 signaling is transmitted) may be instructed through the L1 signaling.

Figure 13:
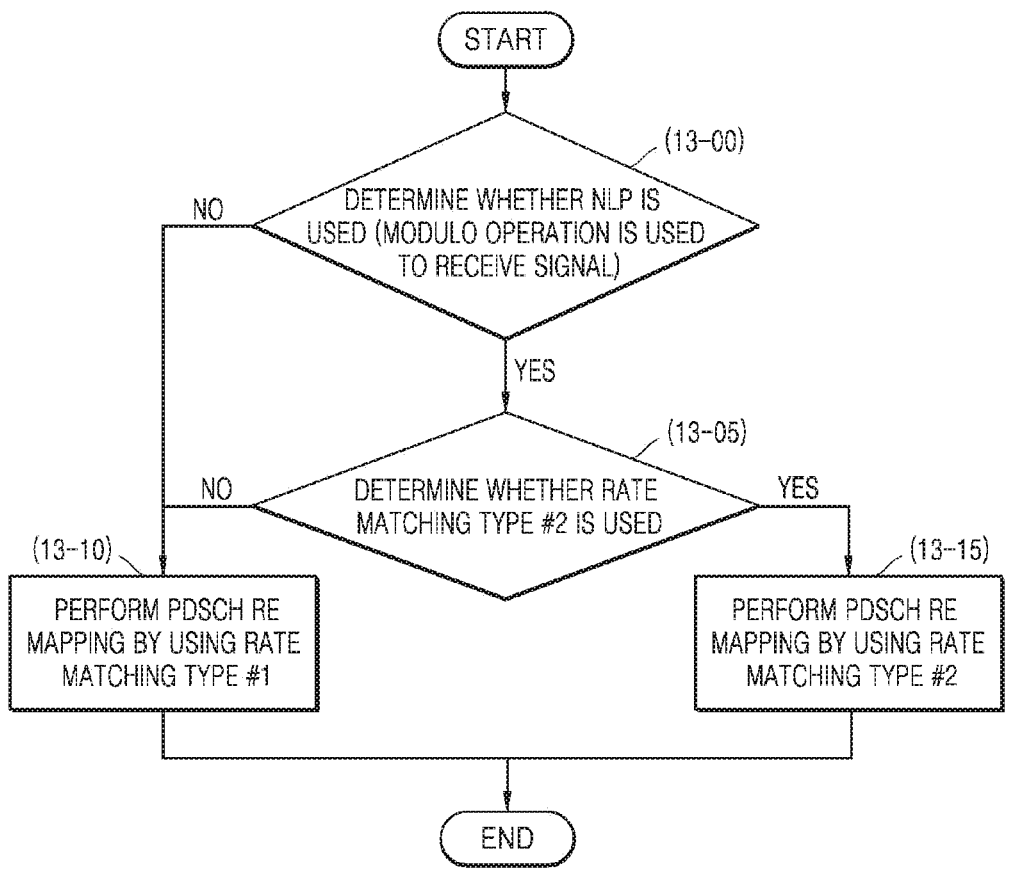
FIG. 13 is a flowchart illustrating a rate matching method according to an embodiment of the disclosure.

FIG. 13 is a flowchart illustrating a rate matching method according to an embodiment of the disclosure.

Referring to FIG. 13, n operation 13-00, a BS may determine whether a terminal uses NLP.

In operation 13-10, the BS and the terminal may use rate matching type #1 when the NLP is not used. For example, the BS may perform PDSCH RE mapping by using the rate matching type #1.

In operation 13-05, the BS may determine whether the terminal uses rate matching type #2 when the NLP is used. In this case, whether the rate matching type #2 is used may be determined through UE capability signaling, higher layer or L1 signaling, or the like. When the terminal does not use the rate matching type #2, the BS may perform PDSCH RE mapping by using the rate matching type #1, as in operation 13-10.

In operation 13-15, when the terminal uses the rate matching type #2, the BS may perform PDSCH RE mapping by using the rate matching type #2.

In the present embodiment of the disclosure, whether the NLP is used (NLP-ON or NLP-OFF) in operation 13-00 may be expressed as whether a modulo operation is used (Modulo-ON or Modulo-OFF) or the like. Whether the NLP is used may be 1-step set/instructed through higher layer or L1 signaling, or whether the NLP is used (NLP-ON/OFF) may be set through higher layer signaling and whether the NLP is actually applied in a designated transmission interval (e.g., a DL slot where a PDSCH allocated by L1 signaling is transmitted) may be instructed through the L1 signaling.

Figure 14:
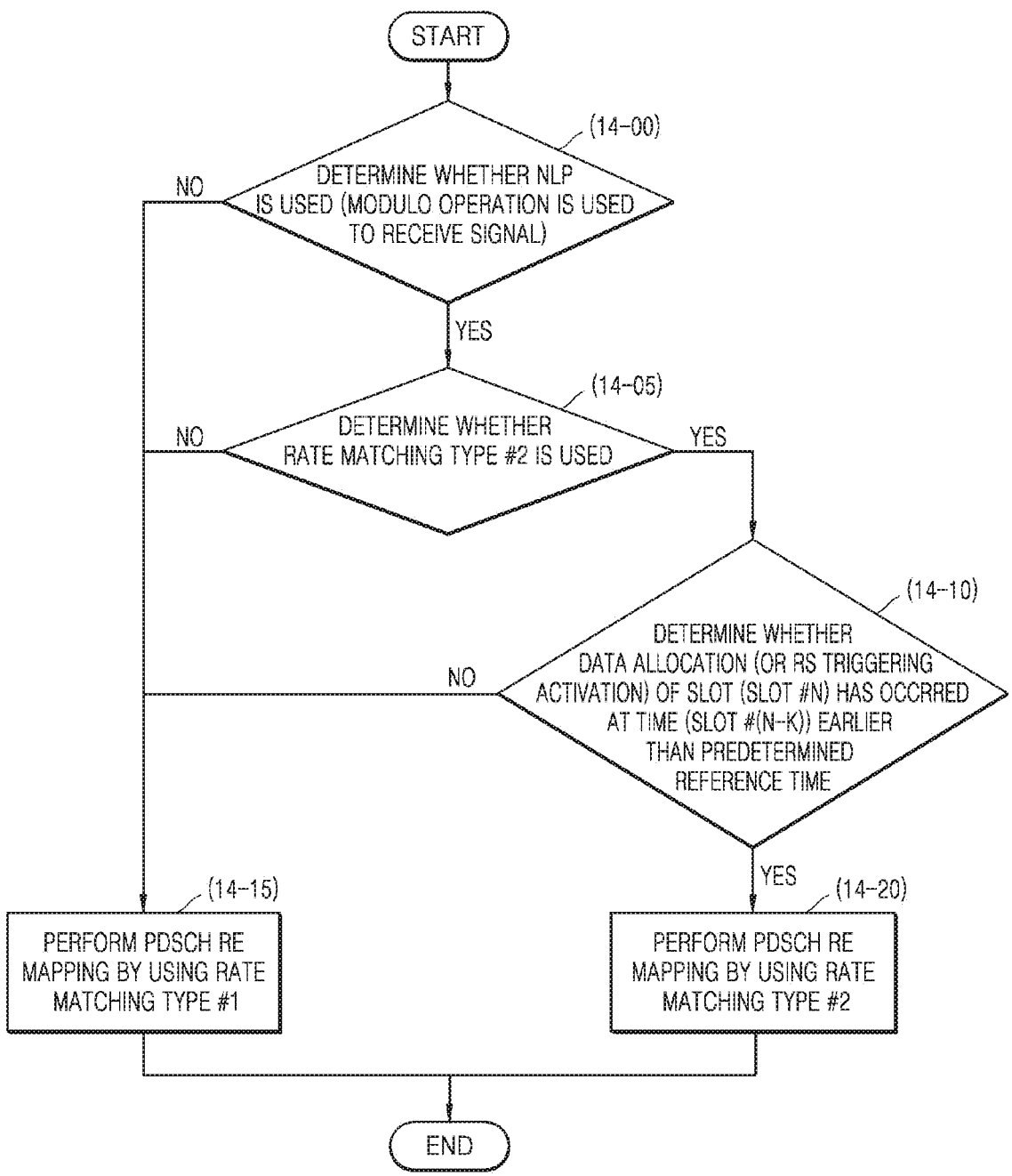
FIG. 14 is a flowchart illustrating a rate matching method according to an embodiment of the disclosure.

FIG. 14 is a flowchart illustrating a rate matching method according to an embodiment of the disclosure.

Referring to FIG. 14, in operation 14-00, a BS may determine whether a terminal uses NLP.

In operation 14-15, the BS and the terminal may use rate matching type #1 when the NLP is not used. For example, the BS may perform PDSCH RE mapping by using the rate matching type #1.

In this case, the NLP is used (NLP-ON or NLP-OFF) may be expressed as whether a modulo operation is used (Modulo-ON or Modulo-OFF) or the like. Whether the NLP is used may be 1-step set/instructed through higher layer or L1 signaling, or whether the NLP is used (NLP-ON/OFF) may be set through higher layer signaling and whether the NLP is actually applied in a designated transmission interval (e.g., a DL slot where a PDSCH allocated by L1 signaling is transmitted) may be instructed through the L1 signaling.

In operation 14-05, the BS may determine whether the terminal uses rate matching type #2 when the NLP is used. In this case, whether the rate matching type #2 is used may be determined through UE capability signaling, higher layer or L1 signaling, or the like.

When the terminal does not use the rate matching type #2, the BS may perform PDSCH RE mapping by using the rate matching type #1, as in operation 14-15.

In operation 14-10, when the terminal uses the rate matching type #2, the BS may determine a condition for using the rate matching type #2. An example of the condition for using the rate matching type #2 is "whether PDSCH allocation, or RS transmission triggering or activation of a slot (e.g., slot #n) using the rate matching type #2 to ensure a terminal processing time has occurred at a time (e.g., slot #(n-k)) earlier than a predetermined reference time". In this case, k may be determined or set to be a positive integer greater than 0 When the above condition is not satisfied, the BS may use the rate matching type #1, as in operation 14-15.

In operation 14-20, when the terminal satisfies the above condition, the BS may use the rate matching type #2. For example, the BS may perform PDSCH RE mapping by using the rate matching type #2.

Although two types, that is, the rate matching type #1 and the rate matching type #2, are described for convenience of explanation in the present embodiment of the disclosure, this is merely an example and the embodiment of the disclosure may be extended to three or more rate matching types according to a type of a signal to which rate matching is applied, a detailed condition, and the like.

Embodiment 2: RS Multiplexing Method Considering NLP

As described above, the influence of interference on a terminal to which LP is applied and the influence of interference on a terminal to which NLP is applied are greatly different from each other, and thus different RS multiplexing methods may be used. For example, a BS and a terminal may apply different multiplexing rules to multiple channels and RSs according to a specific condition, such as whether NLP is used based on at least one multiplexing rule.

In detail, for a terminal to which LP is applied, the BS may enable channels or RSs, such as the control (CORESET or PDCCH) 11-10, the DMRS 11-15, the DMRS CDM group without data 11-20, the CSI-RS 11-25, the Non-DL duration (GP or UL) 11-35 allocated to the terminal to be set not to overlap at the same RE or, when the channels or the RSs are set to overlap at the same RE, some of the channels or the RSs to be punctured or dropped. An RS multiplexing rule for a terminal or a terminal type A to which LP is applied will be referred to as RS multiplexing type #1 for convenience of explanation.

For a terminal to which NLP is applied, another criterion may be applied for RS multiplexing. For a terminal to which NLP may be applied, the BS receives a signal from which interference is pre-cancelled in a transmission interval where NLP is applied, and thus orthogonal RE mapping for improving PDSCH reception performance or other channel and RS reception performance according to a condition may not be required. For example, the BS may instruct the terminal through L1 signaling or may set through RRC/MAC CE signaling so that at least one channel or RS from among SS/PBCH block (SSB), PDCCH, CORESET, CSI-RS for CSI acquisition, CSI-RS for beam management, CSI-RS for tracking, CSI-RS for RRM (CSI-RS for mobility), guard period, ZP CSI-RS, phase tracking RS (PTRS), UL duration including SRS, PUCCH, and PUSCH does not overlap another channel or RS at the same RE in a certain DL transmission interval (e.g., in a DL slot to which NLP is applied). For example, the BS may notify a terminal receiving a PDSCH transmitted by using NLP about information, such as that a DMRS overlaps a CSI-RS, a CORESET overlaps a CSI-RS, a CORESET overlaps a DMRS, or a PTRS overlaps a CSI-RS. An RS multiplexing rule for a terminal or a terminal type B to which NLP is applied will be referred to as rate matching type #2 for convenience of explanation. In the present embodiment of the disclosure, the BS may determine whether the RS multiplexing type #2 may be applied according to UE capability signaling of a terminal.

Figure 15:
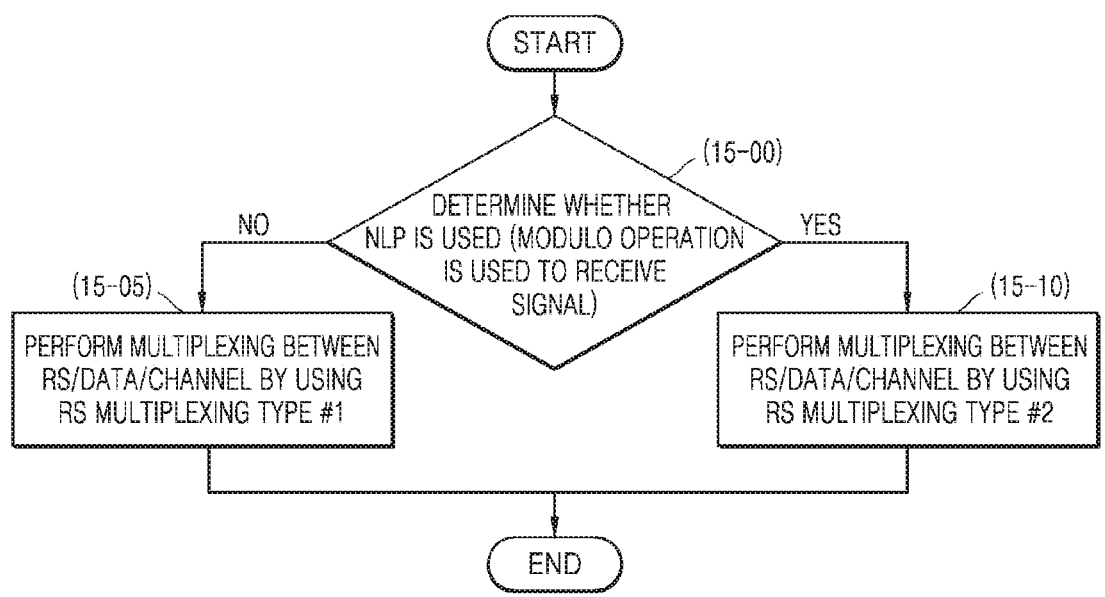
FIG. 15 is a flowchart illustrating an RS multiplexing method according to an embodiment of the disclosure.

FIG. 15 is a flowchart illustrating an RS multiplexing method according to an embodiment of the disclosure.

Referring to FIG. 15, in operation 15-00, a BS may determine whether a terminal uses NLP.

In operation 15-05, the BS and the terminal may use RS multiplexing type #1 when the NLP is not used. For example, the BS may perform multiplexing between RSs/data/channels by using the RS multiplexing type #1.

In operation 15-10, the BS and the terminal may use RS multiplexing type #2 when the NLP is used. For example, the BS may perform multiplexing between RSs/data/channels by using the RS multiplexing type #2.

Whether the NLP is used (NLP-ON or NLP-OFF) in the present embodiment of the disclosure may be expressed as whether a modulo operation is used (Modulo-ON or Modulo-OFF) or the like. In addition, whether the NLP is used may be 1-step set/instructed through higher layer or L1 signaling, or whether the NLP is used (NLP-ON/OFF) may be set through higher layer signaling and whether the NLP is actually applied in a designated transmission interval (e.g., a DL slot where a PDSCH allocated by L1 signaling is transmitted) may be instructed through the L1 signaling.

Figure 16:
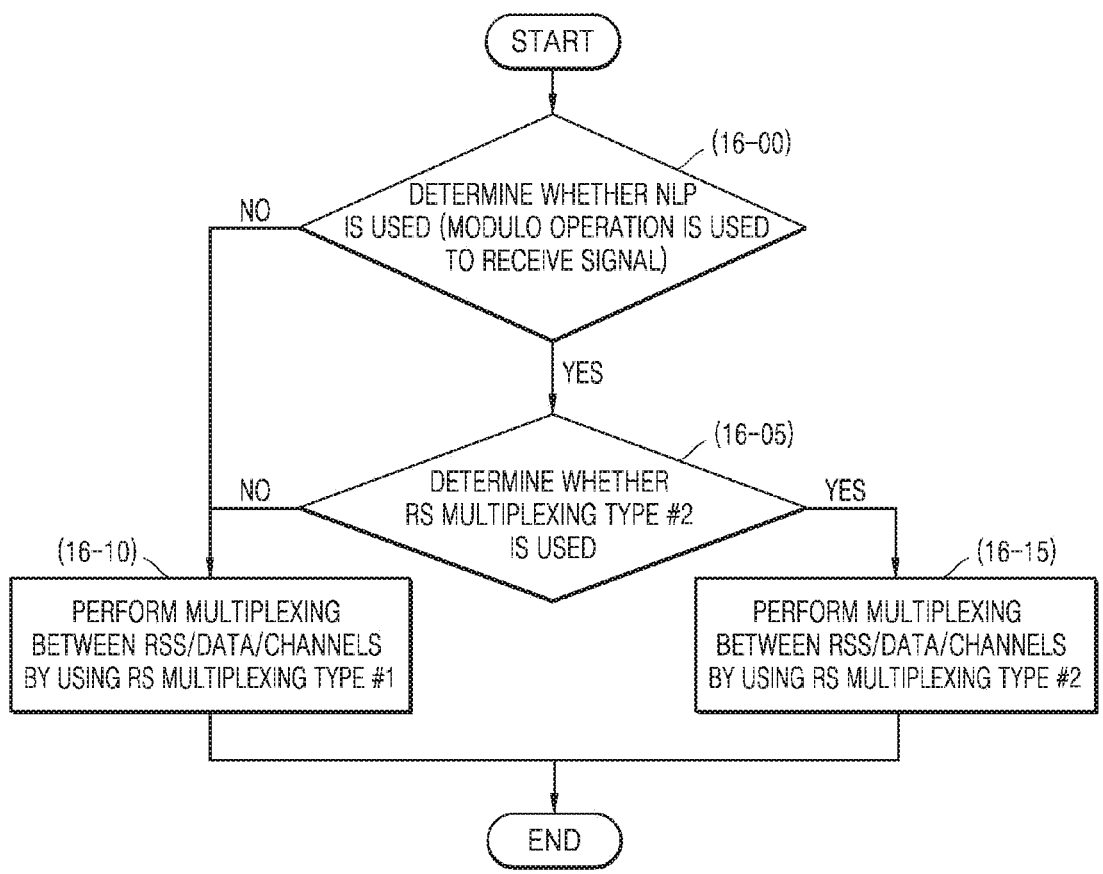
FIG. 16 is a flowchart illustrating an RS multiplexing method according to an embodiment of the disclosure.

FIG. 16 is a flowchart illustrating an RS multiplexing method according to an embodiment of the disclosure.

Referring to FIG. 16, in operation 16-00, a BS may determine whether a terminal uses NLP.

In operation 16-10, the BS and the terminal may use RS multiplexing type #1 when the NLP is not used. For example, the BS may perform multiplexing between RS s/data/channels by using the RS multiplexing type #1.

In operation 16-05, the BS may determine whether the terminal uses RS multiplexing type #2 when the NLP is used. In this case, whether the RS multiplexing type #2 is used may be determined through UE capability signaling, higher layer or L1 signaling, or the like. When the terminal does not use the RS multiplexing type #2, the BS may perform multiplexing between RSs/data/channels by using the RS multiplexing type #1, as in operation 16-10.

In operation 16-15, when the terminal uses the RS multiplexing type #2, the BS may perform multiplexing between RSs/data/channels by using the RS multiplexing type #2.

In the present embodiment of the disclosure, whether the NLP is used (NLP-ON or NLP-OFF) may be expressed as whether a modulo operation is used (Modulo-ON or Modulo-OFF) or the like.

Whether the NLP is used may be 1-step set/instructed through higher layer or L1 signaling, or whether the NLP is used (NLP-ON/OFF) may be set through higher layer signaling and whether the NLP is actually applied in a designated transmission interval (e.g., a DL slot where a PDSCH allocated by L1 signaling is transmitted) may be instructed through the L1 signaling.

Figure 17:
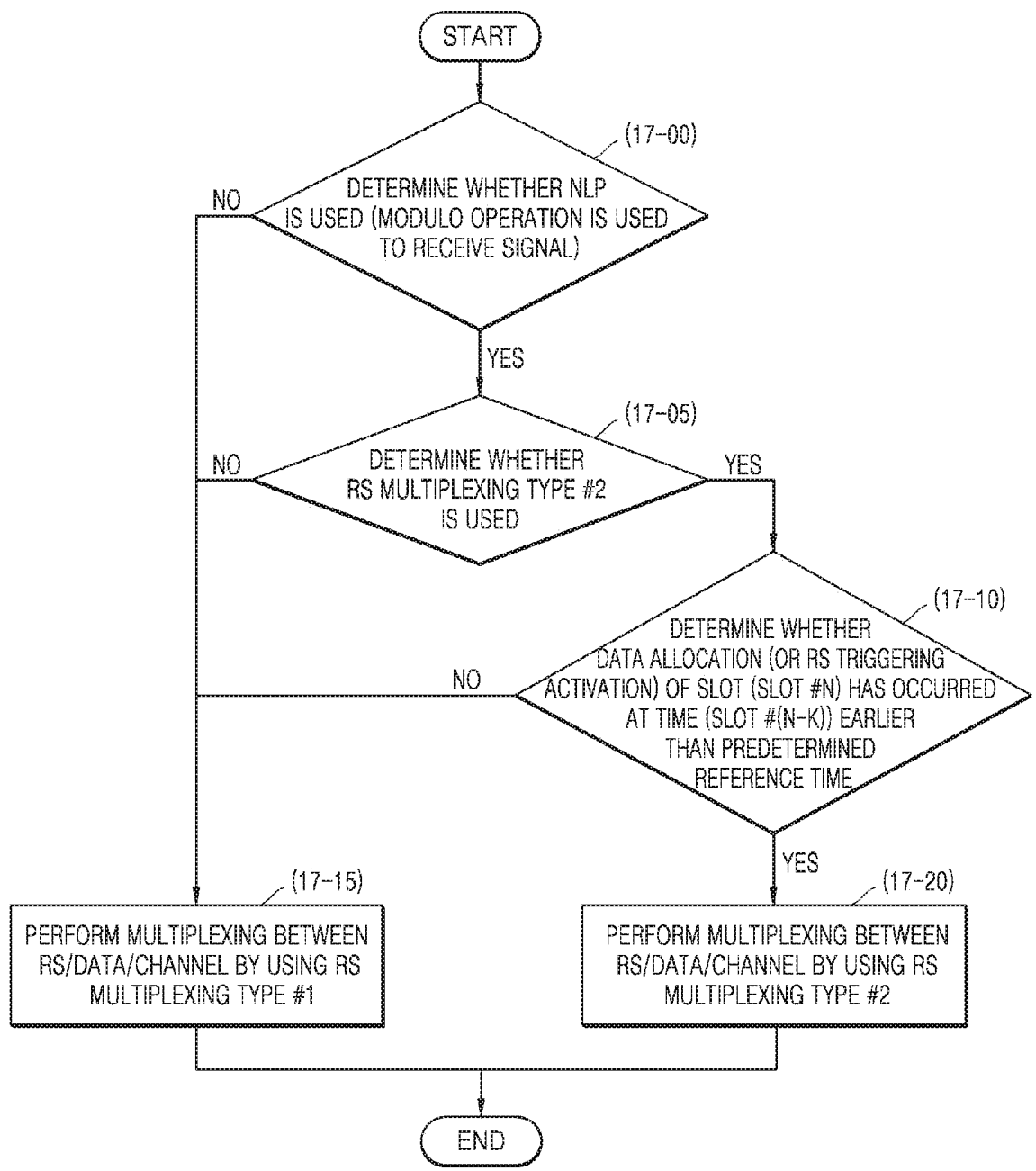
FIG. 17 is a flowchart illustrating an RS multiplexing method according to an embodiment of the disclosure.

FIG. 17 is a flowchart illustrating an RS multiplexing method according to an embodiment of the disclosure.

Referring to FIG. 17, in operation 17-00, a BS may determine whether a terminal uses NLP.

In operation 17-15, the BS and the terminal may use RS multiplexing type #1 when the NLP is not used. For example, the BS may perform multiplexing between RS s/data/channels by using the RS multiplexing type #1.

Whether the NLP is used (NLP-ON or NLP-OFF) may be expressed as whether a modulo operation is used (Modulo-ON or Modulo-OFF) or the like. In addition, whether the NLP is used may be 1-step set/instructed through higher layer or L1 signaling, or whether the NLP is used (NLP-ON/OFF) may be set through higher layer signaling and whether the NLP is actually applied in a designated transmission interval (e.g., a DL slot where a PDSCH allocated by L1 signaling is transmitted) may be instructed through the L1 signaling.

In operation 17-05, the BS may determine whether the terminal uses RS multiplexing type #2. In this case when the NLP is used. In this case, whether the RS multiplexing type #2 is used may be determined through UE capability signaling, higher layer or L1 signaling, or the like.

When the terminal does not use the RS multiplexing type #2, the BS may perform multiplexing between RS s/data/channels by using the RS multiplexing type #1, as in operation 17-15.

In operation 17-10, when the terminal uses the RS multiplexing type #2, the BS may determine a condition for using the RS multiplexing type #2. A representative example of the condition for using the RS multiplexing type #2 is "whether PDSCH allocation, or RS transmission triggering or activation of a slot (e.g., slot #n) using the rate matching type #2 to ensure a terminal processing time has occurred at a time (e.g., slot #(n-k)) earlier than a predetermined reference time". In this case, k may be determined or set to be a positive integer greater than 0 When the above condition is not satisfied, the BS may use the RS multiplexing type #1, as in operation 17-15.

In operation 17-20, when the terminal satisfies the above condition, the BS may use the RS multiplexing type #2. For example, the BS may perform multiplexing between RSs/data/channels by using the RS multiplexing type #2.

Although two types, that is, the RS multiplexing type #1 and the RS multiplexing type #2 are described for convenience of explanation in the present embodiment of the disclosure, this is merely an example and the embodiment of the disclosure may be extended to three or more RS multiplexing types according to a type of a signal to which multiplexing is applied, a detailed condition, and the like.

Embodiment 3: LTE-NR Coexistence Method Considering NLP

Figure 18:
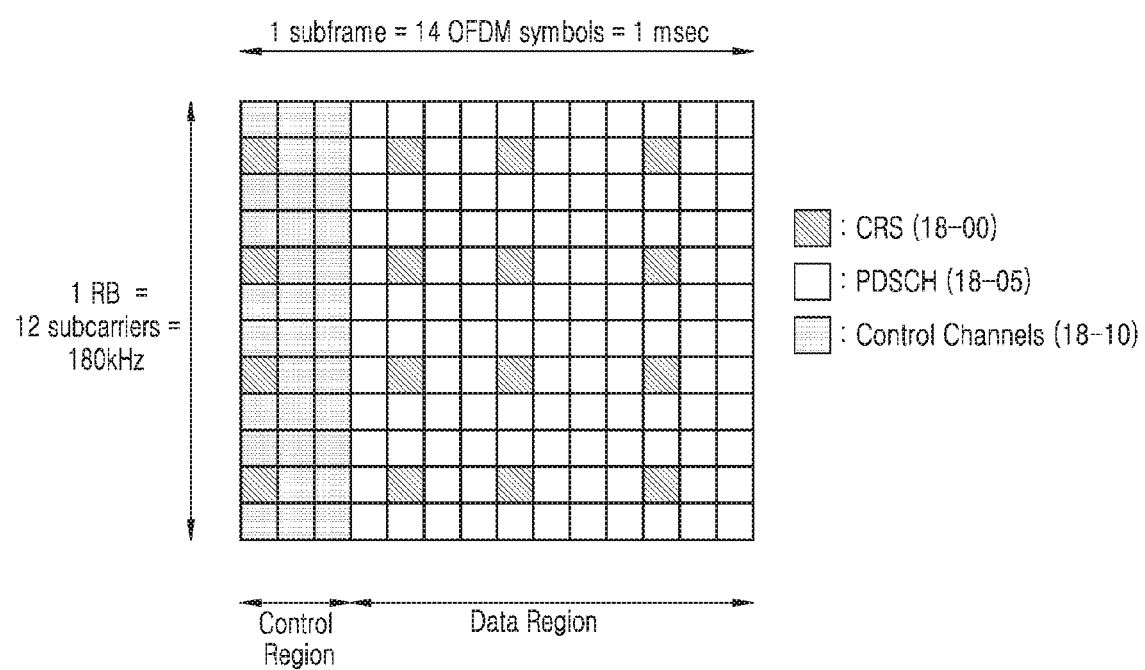
FIG. 18 is a diagram illustrating a long term evolution (LTE) subframe structure according to an embodiment of the disclosure.

FIG. 18 is a diagram illustrating an LTE subframe structure according to an embodiment of the disclosure.

Referring to FIG. 18, an LTE PRB may include 12 subcarriers and 14 OFDM symbols, like an NR slot structure. In this case, at least one CRS port 18-00 may be set and up to three PDCCH symbols 18-10 may be set on a front portion of a subframe of a PDSCH 18-05.

FIG. 19 is a diagram illustrating an application method when an LTE terminal and an NR terminal coexist according to an embodiment of the disclosure.

Referring to FIG. 19, when LTE terminals 19-10 and 19-25 provide services in a carrier frequency band of 2.4 GHz and an NR terminal 19-05 provides a service in a band, e.g., 4 GHz, different from the band of the LTE terminals 19-10 and 19-25, the NR terminal 19-05 may receive a signal from a gNB 19-00 without considering an LTE signal. For example, in this case, a BS may not perform higher layer configuration for RE-level rate matching considering a cell specific reference signal (CRS) on the NR terminal 19-05. For example, a higher layer parameter RateMatchPatternLTE-CRS may not be set.

In contrast, when an NR terminal 19-20 receive a signal from a gNB 19-15 provides a service in the same band as that of the LTE terminals 19-10 and 19-25, in order to prevent contamination of an LTE CRS and performance degradation of the LTE terminals 19-10 and 19-25 and to prevent adverse influence of high transmission power of the LTE CRS on the performance of the NR terminals 19-05 and 19-20, the BS may perform higher layer configuration for RE-level rate matching on the NR terminal 19-20 to perform rate matching for PDSCH REs at a CRS RE position. For example, the higher layer parameter RateMatchPatternLTE-CRS may be set and the NR terminal 19-20 may perform rate matching for RCS REs according to an instruction of the higher layer parameter RateMatchPatternLTE-CRS.

In this case, because the influence of interference on a terminal to which LP is applied and the influence of interference on a terminal to which NLP is applied are different from each other as described above, when an NR terminal and an LTE terminal to which NLP is applied coexist, the following methods may be applied.

A first method involves, according to whether NLP is used, following RE-level rate matching set through higher layer signaling when the NLP is not used and disregarding the RE-level rate matching and mapping a PDSCH to corresponding REs when the NLP is used. For example, the higher layer parameter RateMatchPatternLTE-CRS may not be reflected on PDSCH RE rate matching.

In this case, whether the NLP is used (NLP-ON or NLP-OFF) may be expressed as whether a modulo operation is used (Modulo-ON or Modulo-OFF) or the like. Whether the NLP is used may be 1-step set/instructed through higher layer or L1 signaling, or whether the NLP is used (NLP-ON/OFF) may be set through higher layer signaling and whether the NLP is actually applied in a designated transmission interval (e.g., a DL slot where a PDSCH allocated by L1 signaling is transmitted) may be instructed through the L1 signaling.

A second method involves dynamically instructing, through L1 signaling, whether RE-level rate matching for LTE CRS rate matching of an NR terminal is applied when NLP is used. In detail, when the higher layer parameter RateMatchPatternLTE-CRS is set and NLP is used, a terminal may receive, through DCI, signaling of whether the higher layer parameter RateMatchPatternLTE-CRS is actually applied. In this case, although independent 1-bit signaling may be used, whether the NLP is used may be implicitly instructed by the signaling.

Whether the NLP is used (NLP-ON or NLP-OFF) may be expressed as whether a modulo operation is used (Modulo-ON or Modulo-OFF) or the like. Whether the NLP is used may be 1-step set/instructed through higher layer or L1 signaling, or whether the NLP is used (NLP-ON/OFF) may be set through higher layer signaling and whether the NLP is actually applied in a designated transmission interval (e.g., a DL slot where a PDSCH allocated by L1 signaling is transmitted) may be instructed through the L1 signaling.

A detailed operation of the present embodiment of the disclosure is similar to that of embodiment 1 or embodiment 2 of the disclosure, and thus an explanation thereof will not be given.

Embodiment 4: PDCCH Reception Method Considering NLP

Figure 20:
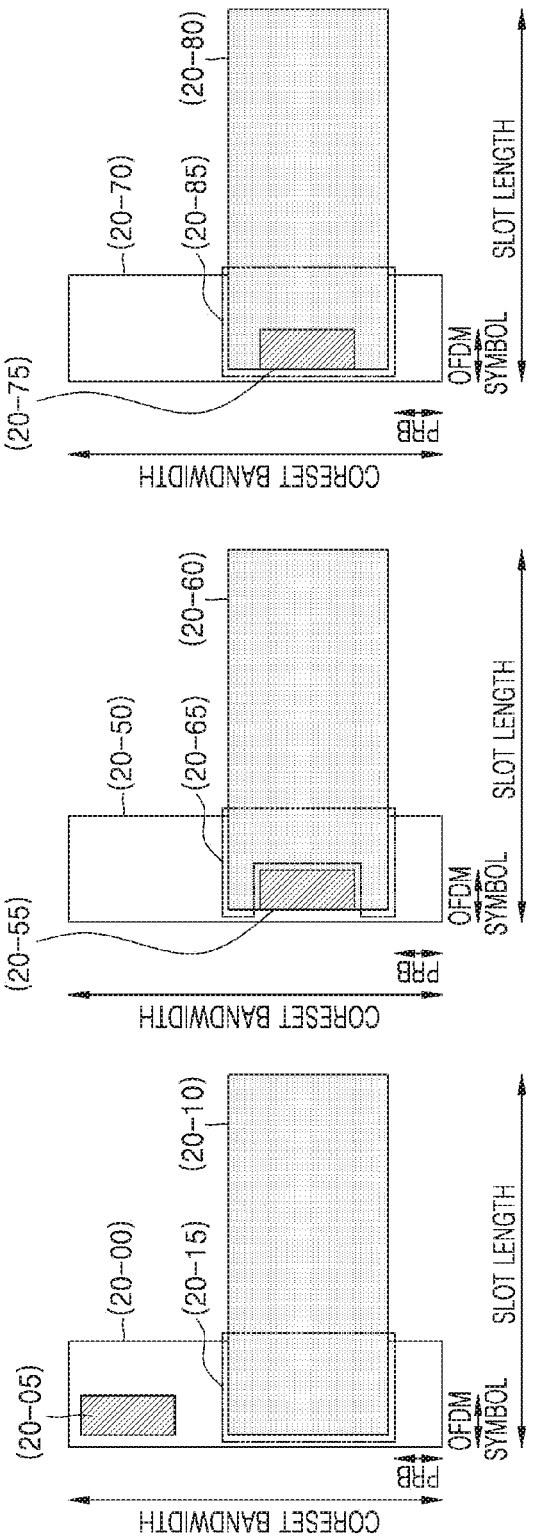
FIG. 20 is a diagram illustrating a physical DL control channel (PDCCH) reception method considering NLP and a rate matching method for a control resource set (CORESET) RE according to an embodiment of the disclosure.

FIG. 20 is a diagram illustrating a PDCCH reception method considering NLP and a rate matching method for a CORESET RE according to an embodiment of the disclosure.

A BS may support overlapping transmission of a PDCCH of a specific terminal and a PDSCH of another terminal considering interference cancellation capability of terminals to which NLP is applied.

Referring to FIG. 20, a terminal may perform blind decoding on its PDCCH 20-05 in a set CORESET 20-00 and then, when a PDSCH 20-10 allocated by the PDCCH 20-05 does not overlap, it may be instructed through higher layer configuration or L1 signaling that a region 20-15 where the CORESET 20-00 and the PDSCH 20-10 overlap each other is not rate matched and a PDSCH RE is mapped.

Likewise, the terminal may perform blind decoding on its PDCCH 20-55 in a set CORESET 20-50 and then, when a PDSCH 20-60 allocated by the PDCCH 20-55 does not overlap, it may be instructed through higher layer configuration or L1 signaling that a region 20-65 where the CORESET 20-50 and the PDSCH 20-60 overlap each other is not rate matched and a PDSCH RE is mapped. In this case, the region 20-65 does not include the PDCCH 20-55 of the terminal.

In another example, the terminal may perform blind decoding on its PDCCH 20-75 in a set CORESET 20-70 and then, when a PDSCH 20-80 allocated by the PDCCH 20-75 does not overlap, it may be instructed through higher layer configuration or L1 signaling that a region 20-85 where the CORESET 20-70 and the PDSCH 20-80 overlap each other is not rate matched and a PDSCH RE is mapped. In this case, the region 20-85 includes the PDCCH 20-75 of the terminal, and in order to apply the present example, the terminal has to be capable of simultaneously receiving the PDCCH 20-75 and the PDSCH 20-80 in the same time frequency resource. For example, the terminal has to be capable of performing spatial multiplexing for the PDCCH 20-75 and the PDSCH 20-80, and the BS may apply the present example only to terminals reporting through UE capability signaling that the terminals are capable of performing the above operation.

Although the PDCCHs 20-05, 20-55, and 20-75 and the PDSCHs 20-10, 20-60, and 20-80 allocated by the PDCCHs 20-05, 20-55, and 20-75 are transmitted in the same slot in the present embodiment of the disclosure, the disclosure is not limited thereto and may be extended to a case where the PDCCHs 20-05, 20-55, and 20-75 and the PDSCHs 20-10, 20-60, and 20-80 allocated by the PDCCHs 20-05, 20-55, and 20-75 are transmitted in different slots, that is, scheduling delay exists.

Figure 21:
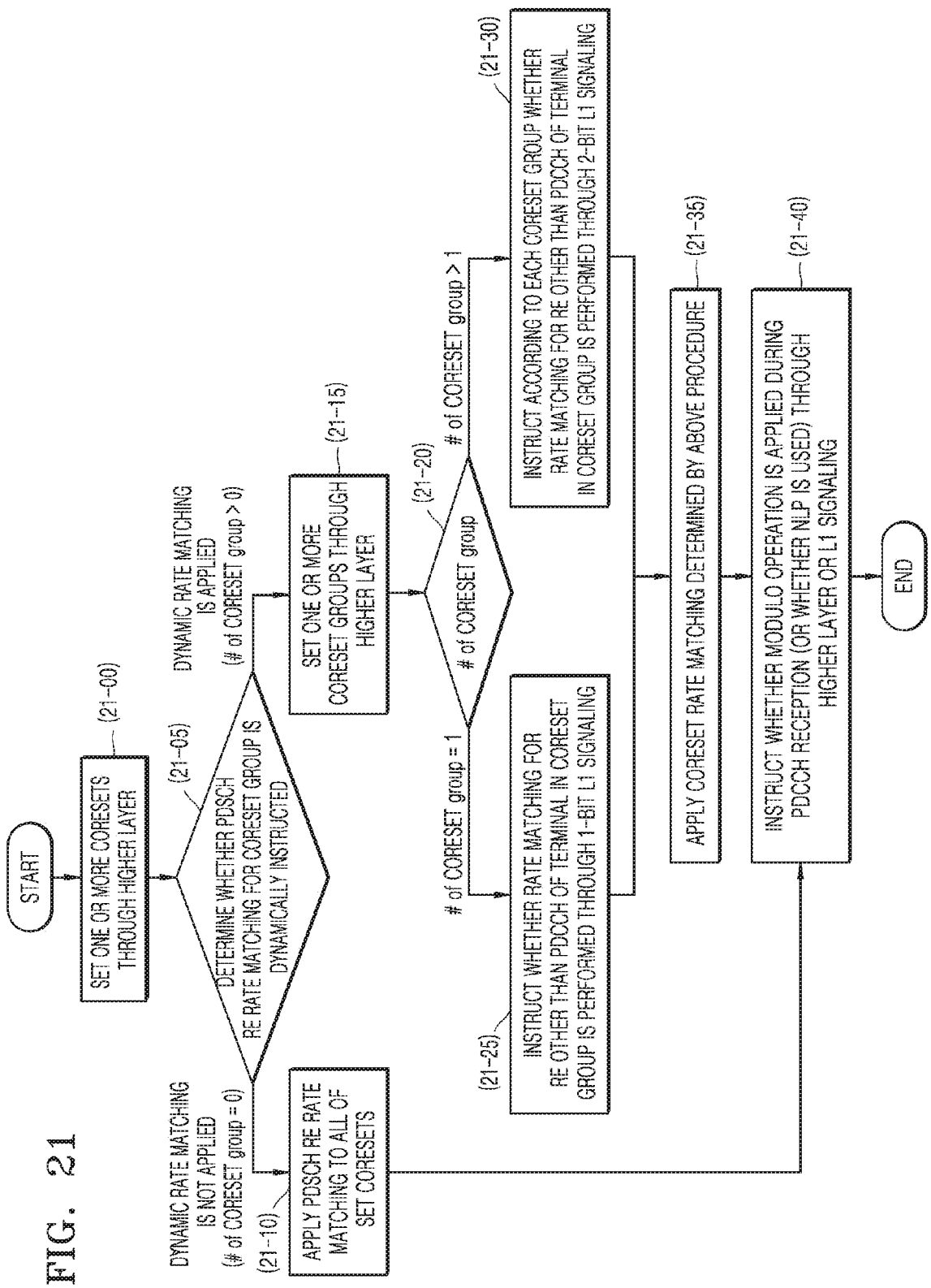
FIG. 21 is a flowchart illustrating operations of a base station (BS) and a terminal according to an embodiment of the disclosure.

FIG. 21 is a flowchart illustrating operations of a BS and a terminal according to an embodiment of the disclosure.

Referring to FIG. 21, in operation 21-00, a BS may set one or more CORESETs to a terminal through a higher layer.

In operation 21-05, the BS may determine whether PDSCH rate matching for a CORESET group is dynamically instructed.

In operation 21-10, when dynamic rate matching is not applied, that is, when the number of CORESET groups is 0, the BS may apply PDSCH RE rate matching to all of the set CORESETs.

In operation 21-15, when the dynamic rate matching is applied, the BS may set one or more CORESET groups through a higher layer.

In operation 21-20, the BS may determine whether the number of set CORESET groups exceeds 1.

In operation 21-25, when the number of set CORESET groups is 1, the BS may instruct whether rate matching for an RE other than a PDCCH of the terminal in the CORESET group is performed through 1-bit L1 signaling.

In operation 21-30, when the number of set CORESETS groups is greater than 1, the BS may instruct according to each CORESET group whether rate matching for an RE other than a PDCCH of the terminal in the CORESET group is performed through 2-bit L1 signaling.

In operation 21-35, the BS and the terminal may apply CORESET rate matching determined by the above procedure.

In operation 21-40, the BS may set or instruct whether a modulo operation is to be applied during PDCCH reception (or whether NLP is used for PDCCH transmission) through higher layer or L1 signaling.

Figure 22:
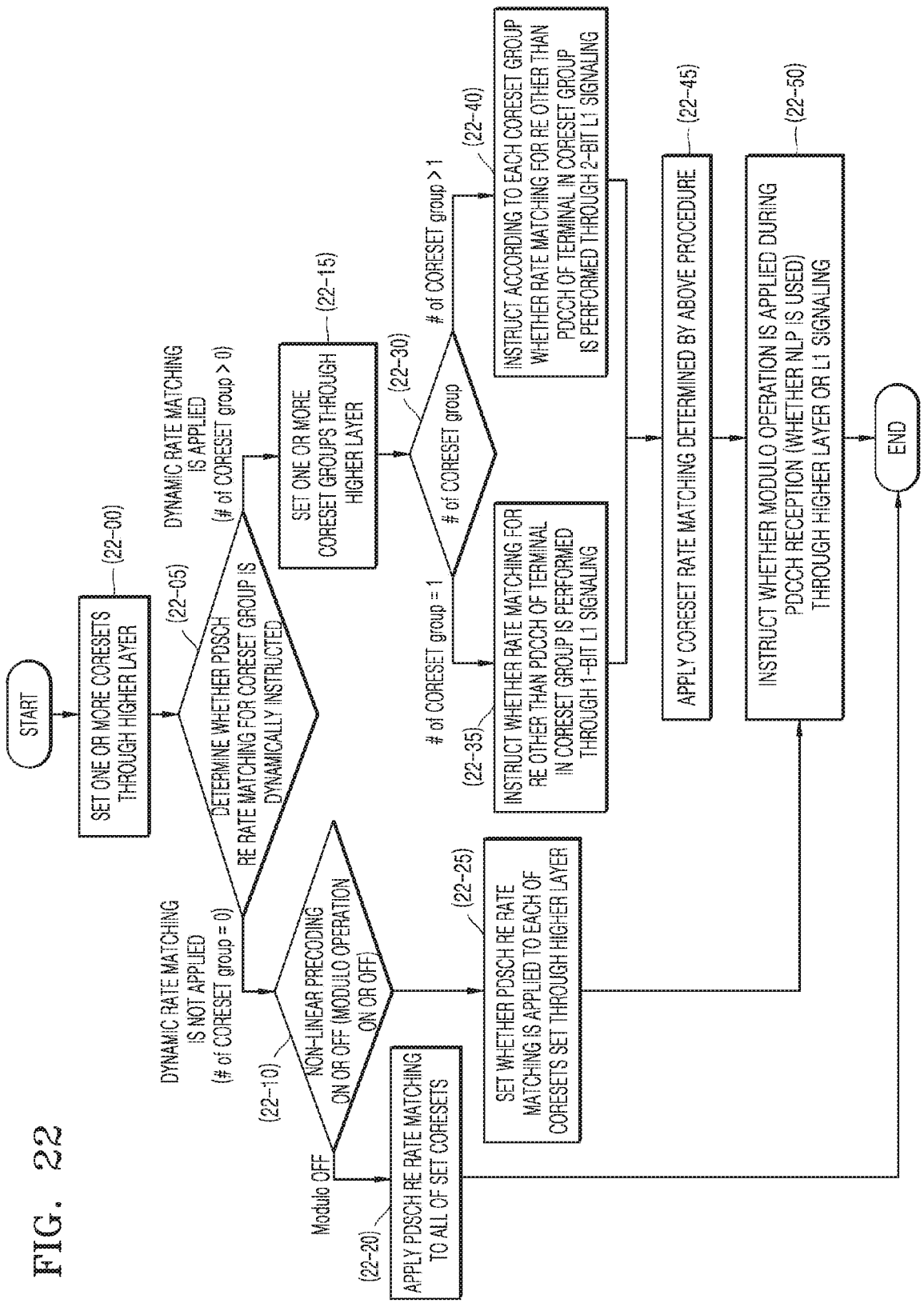
FIG. 22 is a flowchart illustrating operations of a BS and a terminal according to an embodiment of the disclosure.

FIG. 22 is a flowchart illustrating operations of a BS and a terminal according to an embodiment of the disclosure.

Referring to FIG. 22, in operation 22-00, a BS may set one or more CORESETs through a higher layer.

In operation 22-05, the BS may determine whether PDSCH rate matching for a CORESET group is dynamically instructed.

In operation 22-10, when dynamic rate matching is not applied, that is, when the number of CORESET groups is 0, the BS may instruct whether NLP for PDCCH or PDSCH transmission is applied.

In operation 22-20, when the NLP is not applied (or when a modulo operation is not applied), the BS may apply PDSCH RE rate matching to all of the set CORESETs.

In operation 22-25, when the NLP is applied (or when the modulo operation is applied), the BS may set whether PDSCH RE rate matching is applied to each of the CORESETs set through the higher layer.

In operation 22-15, when the BS determines to apply the dynamic rate matching, the BS may set one or more CORESET groups through a higher layer.

In operation 22-30, the BS may determine whether the number of set CORESET groups exceeds 1.

In operation 22-35, when the number of set CORESET groups is 1, the BS may instruct whether rate matching for an RE other than a PDCCH of the terminal in the CORESET group is performed through 1-bit L1 signaling.

In operation 22-40, when the number of set CORESET groups is greater than 1, the BS may instruct according to each CORESET group whether rate matching for an RE other than a PDCCH of the terminal in the CORESET group is performed through 2-bit L1 signaling.

In operation 22-45, the BS and the terminal may apply CORESET rate matching determined by the above procedure.

In operation 22-50, the BS may set or instruct whether the modulo operation is to be applied during PDCCH reception (or whether the NLP is used for PDCCH transmission) through higher layer or L1 signaling in operations 22-25 and 22-45.

Embodiment 5: RS Reception Method Considering NLP

In a method similar to that described with reference to embodiment 4 of the disclosure, a BS may support overlapping transmission of an RS of a specific terminal and a channel or a signal of another terminal considering interference cancellation capability of terminals to which NLP is applied. The BS may instruct through higher layer or L1 signaling whether a terminal is to apply a modulo operation during RS reception according to when the terminal may apply NLP or the modulo operation. In this case, a modulo operation application indicator for receiving the RS may be a parameter independent of a modulo operation application indicator for receiving a PDSCH or a modulo operation application indicator for receiving a PDCCH described in the above embodiments of the disclosure, or may be instructed by being joint encoded with one or more indicators.

The terminal may perform blind decoding on its RS and then, a PDSCH allocated by the RS does not overlap, it may be instructed through higher layer configuration or L1 signaling that a region where the RS and the PDSCH overlap each other is not rate matched and a PDSCH RE is mapped.

Figure 23:
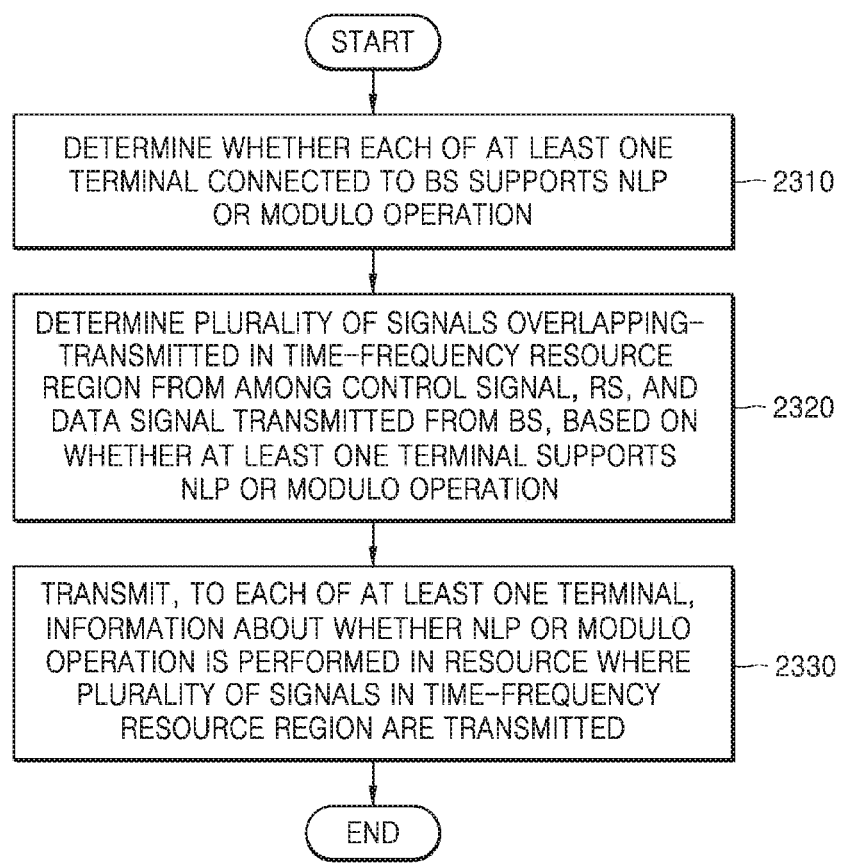
FIG. 23 is a flowchart illustrating a method, performed by a BS, of transmitting/receiving a signal according to whether NLP is performed according to an embodiment of the disclosure.

FIG. 23 is a flowchart illustrating a method, performed by a BS, of transmitting/receiving a signal according to whether NLP is performed according to an embodiment of the disclosure.

Referring to FIG. 23, in operation 2310, the BS may determine whether each of at least one terminal connected to the BS supports NLP or a modulo operation. The BS may determine whether each of the at least one terminal supports the NLP or the modulo operation based on performance information received from each of the at least one terminal.

In operation 2320, the BS may determine a plurality of signals that are overlapping-transmitted in a time-frequency resource region from among a control signal, an RS, and a data signal transmitted from the BS, based on whether the at least one terminal supports the NLP or the modulo operation.

The BS according to an embodiment of the disclosure may determine a plurality of signals overlapping-transmitted from among a control signal, an RS, and a data signal for a terminal that supports the NLP or the modulo operation from among the at least one terminal. In another embodiment of the disclosure, the BS may determine whether the terminal supporting the NLP or the modulo operation uses rate matching or RS multiplexing supporting the NLP or the modulo operation. In another embodiment of the disclosure, the BS may determine whether the terminal supporting the NLP or the modulo operation and using the rate matching or the RS multiplexing supporting the NLP or the modulo operation satisfies a condition described with reference to FIGS. 14 and 17.

In operation 2330, the BS may transmit, to each of the at least one terminal, information about whether the NLP or the modulo operation is performed in a resource where the plurality of signals in the time-frequency resource region are transmitted. The BS may transmit, to each of the at least one terminal, information about whether the NLP or the modulo operation is performed through higher layer signaling or L1 signaling.

Figure 24:
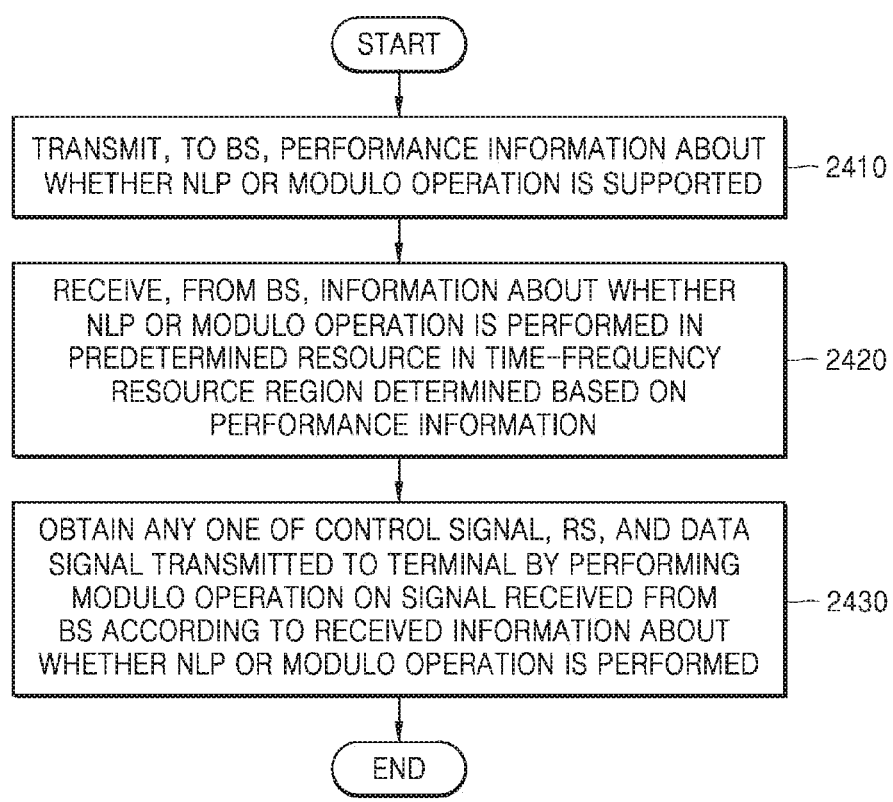
FIG. 24 is a flowchart illustrating a method, performed by a terminal, of transmitting/receiving a signal according to whether NLP is performed according to an embodiment of the disclosure.

FIG. 24 is a flowchart illustrating a method, performed by a terminal, of transmitting/receiving a signal according to whether NLP is performed according to an embodiment of the disclosure.

Referring to FIG. 24, in operation 2410, a terminal may transmit, to a BS, performance information about whether NLP or a modulo operation is supported.

In operation 2420, the terminal may receive, from the BS, information about whether the NLP or the modulo operation is performed in a predetermined resource in a time-frequency resource region determined based on the performance information. The terminal may receive, from the BS, the information about whether the NLP or the modulo operation is performed through higher layer signaling or L1 signaling.

In operation 2430, the terminal may perform the modulo operation on a signal received from the BS according to the received information about whether the NLP or the modulo operation is performed and may obtain any one of a control signal, an RS, and a data signal transmitted to the terminal.

According to an embodiment of the disclosure, when the terminal supports spatial multiplexing, the terminal may simultaneously decode the control signal and the data signal of the terminal from the signal received from the BS, or may simultaneously decode the RS and the data signal of the terminal.

It would be obvious that the above embodiments of the disclosure are not independent from one another and may be appropriately combined and applied according to an environment.

Figure 25:
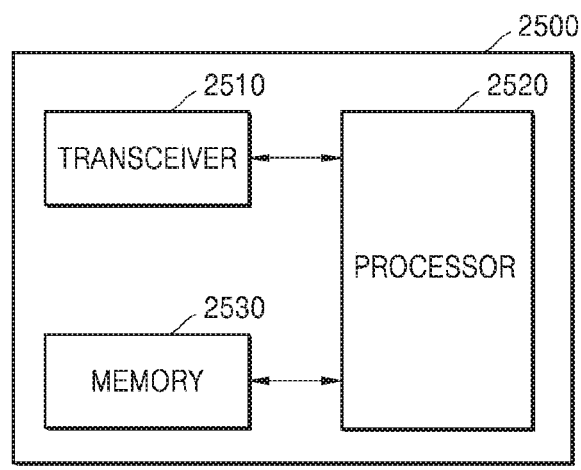
FIG. 25 is a block diagram of a terminal according to an embodiment of the disclosure.
Figure 26:
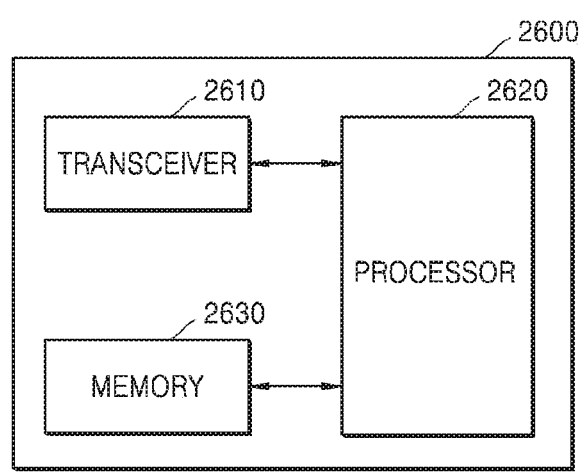
FIG. 26 is a block diagram of a BS according to an embodiment of the disclosure.

Block diagrams of a terminal and a BS for performing the above embodiments of the disclosure are illustrated in FIGS. 25 and 26. Rate matching and RS multiplexing methods for NLP are illustrated in embodiments 1 through 5 of the disclosure, and in order to perform the rate matching and RS multiplexing methods, a transceiver, a processor, and a memory of the BS and the terminal have to operate according to each embodiment of the disclosure.

FIG. 25 is a block diagram of a terminal according to an embodiment of the disclosure.

Referring to FIG. 25, a terminal 2500 according to an embodiment of the disclosure may include a transceiver 2510, a processor 2520, and a memory 2530. The transceiver 2510 of the terminal 2500 may be divided into a transmitter and a receiver. The transceiver 2510 may transmit/receive a signal to/from a BS. Here, the signal may include control information, an RS, and data. To this end, the transceiver 2510 may include an RF transmitter that up-converts and amplifies a frequency of a transmitted signal, and an RF receiver that performs low-noise amplification on a received signal and down-converts a frequency. In addition, the transceiver 2510 may receive a signal through a wireless channel, may output the signal to the processor 2520, and may transmit a signal output from the processor 2520 through the wireless channel. The processor 2520 may control a series of processes to operate the terminal 2500 according to the above embodiment of the disclosure. For example, the transceiver 2510 may receive a signal including at least one rate matching or RS multiplexing-related configuration information from the BS and the processor 2520 may control the rate matching or RS multiplexing-related configuration information to be analyzed.

The memory 2530 may store the RS, the control information, or the data included in the signal obtained by the terminal 2500, and may store data generated necessary for control of the processor 2520 and data generated during the control of the processor 2520. The memory 2530 may include any of various media, such as read-only memory (ROM), random-access memory (RAM), a hard disc, a compact disc-ROM (CD-ROM) or/and a digital versatile disk (DVD).

FIG. 26 is a block diagram of a BS according to an embodiment of the disclosure.

Referring to FIG. 26, a BS 2600 may include a transceiver 2610, a processor 2620, and a memory 2630. The transceiver 2610 of the BS 2600 may be divided into a transmitter and a receiver. The transceiver 2610 may transmit and receive a signal to and from a terminal. The signal may include control signal, an RS, and data. To this end, the transceiver 2610 may include an RF transmitter that up-converts and amplifies a frequency of a transmitted signal, and an RF receiver that performs low-noise amplification on a received signal and down-converts a frequency. In addition, the transceiver 2610 may receive a signal through a wireless channel, may output the signal to the processor 2620, and may transmit a signal output from the processor 2620 through the wireless channel. The processor 2620 may control a series of processes to operate the BS 2600 according to the above embodiment of the disclosure. For example, the processor 2620 may control whether rate matching or RS multiplexing is applied and a detailed method to be determined and rate matching or RS multiplexing configuration/instruction information to be transmitted to the terminal to be generated. Next, the processor 2620 may transmit the rate matching or RS multiplexing configuration/instruction information to the terminal.

In addition, according to an embodiment of the disclosure, the processor 2620 may control DCI including rate matching or RS multiplexing processing information to be generated.

The memory 2630 may store data necessary for control of the processor 2620 and data generated during the control of the processor 2620. The memory 2630 may include any of various media, such as ROM, RAM, a hard disc, a CD-ROM, or/and a DVD.

The disclosure may provide a wireless transmission/reception method for NLP-based transmission and a BS/terminal operation. More particularly, according to the disclosure, RS or control channel transmission burden in a time/frequency resource to which NLP is applied may be minimized and data traffic may be increased. In addition, embodiments of the disclosure may be combined and operated according to needs. For example, first parts of embodiment 1 and embodiment 2 of the disclosure, and parts of embodiments 3 through 5 of the disclosure may be combined and a BS and a terminal may operate.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of transmitting and receiving a signal, by a base station (BS), in a wireless communication system, the method comprising:
    receiving capability information regarding non linear precoding (NLP), from a terminal;
    in case that support of rate matching type corresponding to the NLP, from among a plurality of rate matching types, is identified based on the received capability information, transmitting information indicating that the rate matching type corresponding to the NLP is applied, to the terminal;
    identifying a resource element in which a plurality of signals are overlapped based on the rate matching type corresponding to the NLP; and
    transmitting the overlapped signals on the identified resource element.

2. The method of claim 1, further comprising:
    identifying the plurality of signals that are overlapping-transmitted from among a control signal, a reference signal (RS), and a data signal, of the terminal supporting the NLP.

3. The method of claim 1, further comprising:
    identifying the rate matching type of the terminal supporting the NLP; and identifying at least one signal that are overlapping-transmitted with a data signal among a control signal and a reference signal (RS).

4. The method of claim 3, wherein
the plurality of signals are overlapping transmitted on the resource element located after predetermined time period from a slot, in which the information indicating that the rate matching type corresponding to the NLP is applied, is transmitted.

5. The method of claim 1, further comprising:
identifying a reference signal (RS) multiplexing type of the terminal supporting the NLP; and
identifying at least one signal that are overlapping-transmitted with a data signal among a control signal and a RS, based on the identified RS multiplexing type corresponding to the NLP.

6. The method of claim 1, wherein the information indicating that the rate matching type corresponding to the NLP is applied, is transmitted through an upper layer signaling or a layer 1 (L1) signaling.

7. A method of transmitting and receiving a signal, by a terminal, in a wireless communication system, the method comprising:
transmitting, to a base station (BS), capability information regarding nonlinear precoding (NLP);
in case that the terminal supports rate matching type corresponding to the NLP among a plurality of rate matching types, receiving information indicating that the rate matching type corresponding to the NLP is applied, from the BS; and
receiving
a plurality of signals overlapped on a resource element identified, at the BS, based on the rate matching type corresponding to the NLP.

8. The method of claim 7, wherein the information indicating that the rate matching type corresponding to the NLP is applied includes location information regarding a resource in which the non-linear precoding is performed.

9. The method of claim 7,
wherein the capability information includes information regarding whether the terminal supports a spatial multiplexing, and
wherein in case that the terminal supports the spatial multiplexing, the plurality of signals are obtained based on modulation operation.

10. A base station (BS) of transmitting and receiving a signal in a wireless communication system, the BS comprising:
a transceiver; and
a processor configured to:
receive, via the transceiver, capability information regarding non linear precoding (NLP), from a terminal,
in case that support of rate matching type corresponding to the NLP, from among a plurality of rate matching types, is identified based on the received capability information, transmit, via the transceiver, information indicating that the rate matching type corresponding to the NLP is applied, to the terminal,
identify a resource element in which a plurality of signals are overlapped based on the rate matching type corresponding to the NLP, and
transmit, via the transceiver, the overlapped signals on the identified resource element.

11. The BS of claim 10, wherein the processor is further configured to:
identify the plurality of signals that are overlapping-transmitted from among a control signal, a reference signal (RS), and a data signal, of the terminal supporting the NLP.

12. The BS of claim 10, wherein the processor is further configured to:
identify the rate matching type of the terminal supporting the NLP, and
identify at least one signal that are overlapping-transmitted with a data signal among a control signal and a reference signal (RS).

13. The BS of claim 12, wherein the
plurality of signals are overlapping transmitted on the resource element located after predetermined time period from a slot in which the information indicating that the rate matching type corresponding to the NLP is applied, is transmitted.

14. The BS of claim 10, wherein the processor is further configured to:
identify a reference signal (RS) multiplexing type of the terminal supporting the NLP, and
identify at least one signal that are overlapping-transmitted with a data signal among a control signal and a RS, based on the identified multiplexing type corresponding to the NLP.

15. The BS of claim 10, wherein
information indicating that the rate matching type corresponding to the NLP is applied, is transmitted through an upper layer signaling or a layer 1 (L1) signaling.

16. A terminal of transmitting and receiving a signal in a wireless communication system, the terminal comprising:
a transceiver; and
a processor configured to:
transmit, via the transceiver, to a base station (BS), capability information regarding nonlinear precoding (NLP),
in case that the terminal supports rate matching type corresponding to the NLP among a plurality of rate matching types, receive information indicating that the rate matching type corresponding to the NLP is applied, via the transceiver, from the BS, and
receive, via the transceiver, a plurality of signals overlapped on a resource element identified, at the BS, based on the rate matching type corresponding to the NLP.

17. The terminal of claim 16, wherein the information indicating that the rate matching type corresponding to the NLP is applied includes location information regarding a resource in which the non-linear precoding is performed.

18. The terminal of claim 16,
wherein the capability information includes information regarding whether the terminal supports a spatial multiplexing, and
wherein in case that the terminal supports the spatial multiplexing, the plurality of signals are obtained based on modulation operation.

* * * * *